United States Patent [19]
Rogut

[11] Patent Number: 5,284,583
[45] Date of Patent: * Feb. 8, 1994

[54] FIBER MEMBRANE ELEMENTS AND MODULES AND METHODS OF FABRICATION FOR FLUID SEPARATION

[75] Inventor: Jan Rogut, Boulder, Colo.

[73] Assignee: Transfair Corporation, Wheatridge, Colo.; a part interest

[*] Notice: The portion of the term of this patent subsequent to Aug. 24, 2010 has been disclaimed.

[21] Appl. No.: 62,574

[22] Filed: May 17, 1993

Related U.S. Application Data

[63] Continuation-in-part of Ser. No. 961,140, Oct. 13, 1992.

[51] Int. Cl.⁵ .............................. B01D 63/02
[52] U.S. Cl. .................... 210/321.8; 156/166; 156/250; 156/433; 210/321.89; 210/500.23; 264/41; 264/DIG. 48; 264/DIG. 62
[58] Field of Search ......... 210/321.72, 321.78-321.81, 210/321.87-321.9, 500.23; 264/41, 45.1, DIG. 48, DIG. 62; 156/166, 180, 250, 256, 269, 291, 294, 296, 330, 433, 441

[56] References Cited

U.S. PATENT DOCUMENTS

| | | | |
|---|---|---|---|
| 4,228,197 | 10/1980 | Means | 426/419 |
| 4,230,463 | 10/1980 | Henis et al. | 55/16 |
| 4,812,184 | 3/1989 | Coplan et al. | 156/84 |
| 4,871,378 | 10/1989 | Pinnau | 55/16 |
| 4,871,379 | 10/1989 | Edwards | 55/158 |
| 4,883,023 | 11/1989 | Tsang et al. | 123/25 A |
| 4,944,877 | 7/1990 | Maples | 210/321.74 |
| 4,959,152 | 9/1990 | Michols | 210/651 |
| 5,008,855 | 3/1991 | Nichols | 210/651 |
| 5,051,113 | 9/1991 | Nemser | 55/16 |
| 5,051,114 | 9/1991 | Nemser et al. | 55/16 |
| 5,053,059 | 10/1991 | Nemser | 55/16 |
| 5,053,131 | 10/1991 | Lippold | 210/493.5 |
| 5,071,448 | 12/1991 | Bikson et al. | 55/16 |

FOREIGN PATENT DOCUMENTS 141425 3/1984 Poland.
141077 9/1984 Poland.
286943 9/1990 Poland.

OTHER PUBLICATIONS

Nichols et al, "Novel Hollow Fiber Module Design for Large Scale Applications with High Membrane Performance".
Rochem Separation Systems, "Rochem's Revolutionary Disc Tube Module System".

Primary Examiner—Frank Sever
Attorney, Agent, or Firm—John R. Flanagan

[57] ABSTRACT

A fluid mixture separation membrane element (10) includes elongated hollow pressure-resistant nonpermeable transport arteries (12) and a plurality of flexible hollow fibers (14) of semipermeable material having internal flow channels (20). The hollow tubular transport arteries (12) have exteriors (18) and interior flow passages (16). Each hollow fiber (14) has spaced opposite end portions (22, 24) and an elongated tubular portion (26) extending between and interconnecting the opposite end portions (22, 24). The opposite end portions (22, 24) of each hollow fiber (14) are attached by either an adhesive (28) or another suitable mechanism to the tubular transport artery or arteries (12) so as to provide flow communication between the internal flow channels (20) of the hollow fibers (14) and one of the interior flow passages (16) or the exteriors (18) of the hollow transport arteries (12). The flexible hollow membrane fibers (14) have thin walls, small diameters and short lengths such that they can provide a densely-packed extended surface area for enhanced separation of a raw fluid mixture into permeate and retentate portions without creation of such backpressure as would result in reduction of the forces driving the separation process. The hollow fibers (14) can be arranged in various forms, such as individual hollow fibers, bundles of hollow fibers, knitted or wefted textiles, and fiber carpets or rugs. The fiber membrane elements (10) are fabricated by using various types of rotating, winding, and swinging methods.

71 Claims, 14 Drawing Sheets

FIBER MEMBRANE ELEMENTS AND MODULES AND METHODS OF FABRICATION FOR FLUID SEPARATION

Cross-Reference to Related Application

This application is a continuation-in-part of copending U.S. patent application Ser. No. 07/961,140, filed Oct. 13, 1992 pending.

TECHNICAL FIELD

The present invention generally relates to fluid membrane separation using fiber membrane technology and, more particularly, is concerned with fiber membrane elements and methods for fabricating membrane elements being capable of improved separation of a fluid mixture into permeate and retentate portions.

BACKGROUND ART

A membrane material is a semi-permeable physical barrier having the property of differentiation between the rates of transport of different components of a fluid mixture. The selective transport of components of the fluid mixture at different rates is generated by the gradients of driving forces, such as pressure, partial pressure and temperature. Selective transport basically results in the dividing of the raw fluid mixture into retentate and permeate portions. The retentate portion is enriched with slowly permeable components of the raw mixture, whereas the permeate portion is enriched with components of the raw mixture which migrate faster.

The membrane separation process is typically carried out in a module fabricated from elements of the membrane material. The module typically has a feed inlet leading to a first flow passage on one side of the membrane material of the elements, a retentate outlet leading from the first flow passage, and a permeate outlet leading from a second flow passage on an opposite side of the membrane material of the elements across which the fluid separation process occurs. The fractions of raw mixture leaving the retentate and permeate outlets of the membrane module are the products of the separation process occurring therein as a result of the supply at a higher pressure through the feed inlet of the module of an input stream of the raw fluid mixture to be separated.

The efficiency of the fluid separation process is determined by the properties of the input stream of raw mixture and of the membrane material and its structure. Generally, the fluid separation process exhibits a complex physiochemical mechanism. The productivity of the membrane module increases as the surface area of the membrane material packed in the membrane module increases. Separation efficiency of the module depends inversely on the thickness of the membrane material.

High packing density of membrane surface area inside of the module is realized most frequently by providing the elements of membrane material as hollow fibers of substantial length arranged parallel to one another. The most logical way to increase the packing density of the membrane surface area in the module is to decrease the diameter of the hollow fibers. However, decreasing the diameter of long fibers increases the problem of backpressure due to the resistance of their internal channels to the inflow of the raw mixture and the outflow of the product streams.

The existence of backpressure is a significant limitation on the productivity of current membrane modules containing elements having long hollow fibers with small diameters. In experiments conducted by the inventor herein with fiber membrane elements made of polymethylpentene hollow fibers having an internal diameter of 14 micrometers and a wall thickness of 10 micrometers, it was found that only a small extent of the fiber membrane length, about 5 centimeters, is effective in the separation process. The efficiency of separation drops further with use of thinner capillaries or with highly permeable capillaries with asymmetric wall structures.

Therefore, current membrane modules employing elements with long hollow fibers having small diameters operate at a level of productivity too low for them to be viable commercial products for meeting current uses. Thus, a need remains for improvements in the design of fiber membrane elements which will provide modules capable of operating at acceptable levels of separation productivity and of techniques for fabricating such membrane elements on a cost-effective basis.

DISCLOSURE OF INVENTION

The present invention provides a fluid mixture separation membrane element which is capable of improved separation of a raw fluid mixture into permeate and retentate portions. Basically, the membrane element comprises: (a) a support substrate including an elongated hollow pressure-resistant non-permeable transport artery; and (b) a plurality of flexible hollow fibers of semi-permeable material having internal flow channels. The hollow tubular transport artery has an interior flow passage and an exterior. Each hollow fiber has spaced opposite end portions and an elongated tubular portion extending between and interconnecting the opposite end portions. At least one of the opposite end portions of each hollow fiber is open and attached by either an adhesive or another suitable mechanism to the tubular transport artery so as to provide flow communication between the internal flow channels of the hollow fibers and the interior flow passage of the transport artery or the exterior of the hollow transport artery. Alternatively, both opposite end portions of the hollow fiber can be open and attached to the transport artery. Also, more than one transport artery can be employed such that the opposite end portions of each hollow fiber are open and attached to different transport arteries.

In the previous patent application cross-referenced above, the optimal design was characterized in terms of wall thickness, internal diameter and effective length of the hollow fibers. However, more recent experiments have shown that, in the optimal design, there is an alternative way to characterize the hollow fibers. In this alternative characterization, the hollow fibers exhibit an optimum relationship between the ratio of permeability (P) to wall thickness (l) and the effective lengths of the fibers (L). As in the previous patent application, high packing density of the fibers is still desirable but when fibers have high value of P/l characteristic, the packing density can be lower and still provide sufficient surface area for enhanced separation of the raw fluid mixture into permeate and retentate portions without concern for backpressure in the separation process.

More particularly, as mentioned above, each hollow fiber can be characterized by the value of ratio of permeability "P" to effective thickness of the fiber wall "l" and the effective length L of the hollow fiber. Permeability "P" is defined as the volume of the fluid flow in cubic centimeters (cm³) per second (s) under normal temperature and pressure which is transported through the area of one square centimeter (cm²) of membrane with thickness of the membrane wall of one centimeter under the driving force of one centimeter mercury (cm Hg) of partial or total pressure. The value "l" is the total thickness of the wall in centimeters. Under these definitions, the P/l value effectively characterizes the productivity of hollow fibers without the necessity to specify the thickness of their walls. Using the P/l value the optimal characteristics of the hollow fibers to be applied in the design of the present invention can be effectively defined as falling within the range of from $1 \times 10^{-6}$ to $1 \times 10^{-2}$ and preferably between $1 \times 10^{-5}$ to $1 \times 10^{-3}$ where P/l dimension is (cm³/s cm² cm Hg). The hollow fiber has an effective length falling within the range of from about 0.2 to 100 centimeters, preferably between 1.5 to 78 centimeters, and most preferably between 1.5 to 12 centimeters. The "effective" length of the hollow fiber is defined as that portion of its length in which the flow of fluid within the fiber can proceed in one direction only, such as is the case where the fiber is open at only one of its two opposite ends. If the fiber is open at both opposite ends, then the effective length is about one-half of the actual length of the fiber in view that the flow of fluid can proceed in both opposite directions toward the opposite ends of the fiber. Also, the hollow fibers can be arranged in different forms, such as individual hollow fibers, bundles of hollow fibers, knitted or wefted textiles and membrane carpets or rugs.

The present invention also provides a method for fabricating the hollow fiber membrane element on a cost-effective basis. The membrane element can be fabricated by using various types of rotating, winding or swinging steps to attach the membrane fibers in various configurations with one or more transport arteries of various configurations.

The method for fabricating the membrane element basically comprises the steps of: (a) forming a continuous hollow fiber of fluid separation membrane material into a continuous bundle of hollow fiber strands disposed side-by-side with one another; (b) forming at least one elongated substrate or retention structure in a predetermined pattern along the bundle of fiber strands extending between axially spaced opposite ends of the bundle so as to encapsulate and support portions of the hollow fiber strands; and (c) severing the elongated retention structure from one end to an opposite end thereof and thereby severing the portions of the hollow fiber strands encapsulated by the retention structure so as to provide a pair of retention structure portions encapsulating and supporting open opposite ends of the fiber strands.

The forming of the bundle of hollow fiber strands can employ the step of rotating a cylindrical mandrel or a rectangular frame and feeding the continuous hollow fiber about the rotating cylindrical mandrel or rotating rectangular frame. Alternatively, the forming of the bundle of hollow fiber strands can employ the step of concurrently feeding and swinging the continuous hollow fiber from side-to-side to form a plurality of endless parallel loops and collecting the plurality of endless parallel loops on one above the other. The bundle forming step can further include collecting the endless parallel loops between a pair of elongated strips of tape being adhesively coated on surfaces of the tape strips facing toward one another.

The forming of the retention structure can include applying a strip of an adhesive material across the hollow fiber strands of the bundle between opposite ends thereof. The strip of adhesive material can be zag pattern. The strip of adhesive material can be applied while the bundle of hollow fiber strands is rotating or during an interval when the rotation of the bundle is periodically halted.

Alternatively, the retention structure can be formed by applying heat, such as by scanning a laser beam, across the hollow fiber strands of the bundle between opposite ends thereof to cause partial melting of the portions of the hollow fiber strands such that the portions adhere to one another.

The present invention further provides a membrane module for separating a raw fluid mixture into permeate and retentate portions. The membrane module basically includes an elongated hollow casing, a plurality of elongated support substrates, and a plurality of flexible hollow fibers of semi-permeable membrane material. The casing has a pair of opposite ends and a flow pathway through the interior of said casing. The support substrates are hollow pressure-resistant non-permeable structures disposed in said casing along opposite sides of said flow pathway through said casing. The support substrates extend longitudinally between the opposite ends of the casing and are spaced laterally from one another and define at least one transport passage along one of the support substrates being sealably isolated from the flow pathway through said casing. The flexible hollow membrane fibers define flow channels therethrough and are capable of separating a raw fluid mixture into the permeate and retentate portions. Each hollow fiber has a pair of spaced opposite end portions and an elongated portion extending between and interconnecting the opposite end portions. The opposite end portions of said hollow fibers are attached to and encapsulated by the support substrate such that the elongated portions of the hollow fibers are disposed within the flow pathway of the casing in contact with of a fluid mixture flowing therethrough so as to provide flow communication of the permeate portion of the mixture from the pathway of the casing through said fibers to and through the channels thereof to the transport passage defined by the support substrate. The hollow fibers can be arranged in various forms, such as individual hollow fibers, bundles of hollow fibers, knitted or wefted textiles, and membrane carpets or rugs.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Fluid Mixture Separation Fiber Membrane Elements

Figure 1:
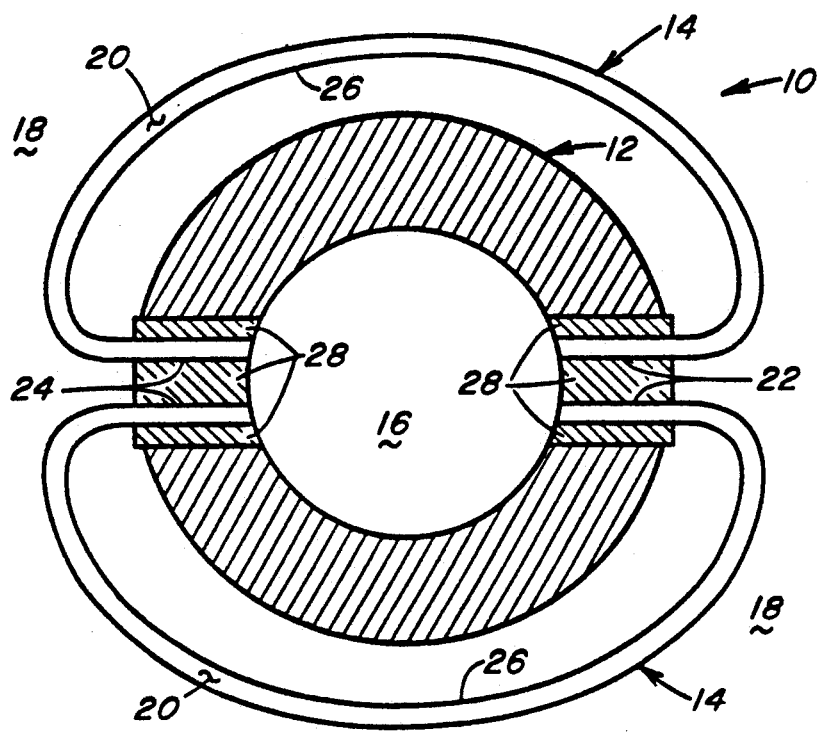
FIG. 1 is a diagrammatic cross-sectional view of a first embodiment of a fluid separation fiber membrane element of the present invention employing hollow fibers in the form of individual loops extending symmetrically about the exteriors of halves of a transport artery having a single interior flow passage.
Figure 2:
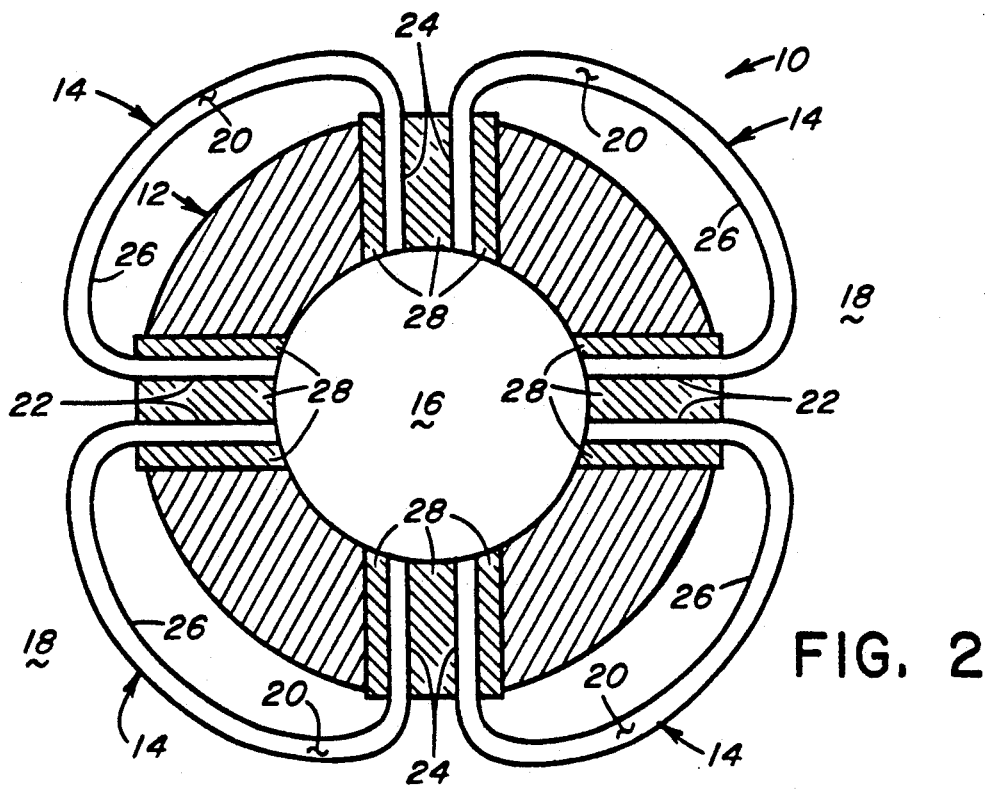
FIG. 2 is a diagrammatic cross-sectional view of a second embodiment of a fluid separation fiber membrane element of the present invention employing hollow fibers in the form of individual loops extending symmetrically about the exteriors of quarters of a transport artery having a single interior flow passage.
Figure 3:
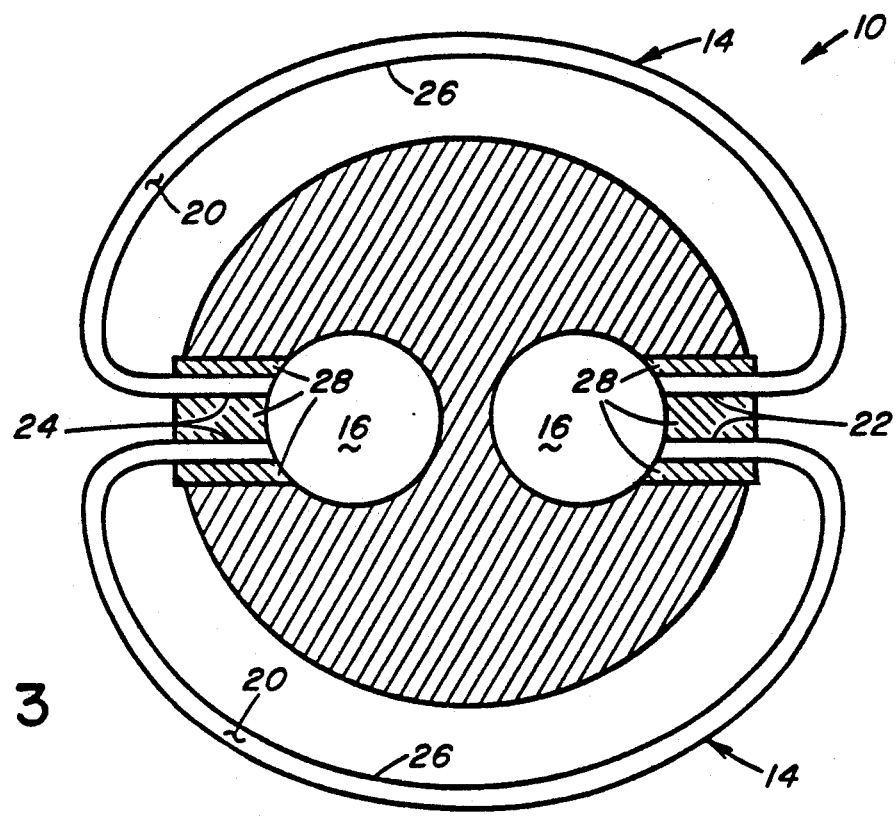
FIG. 3 is a diagrammatic cross-sectional view of a third embodiment of a fluid separation fiber membrane element of the present invention similar to the first embodiment of FIG. 1 but with a transport artery having a pair of interior flow passages.

Referring to the drawings, and particularly to FIGS. 1 to 3, there is illustrated in a diagrammatic cross-sectional form a fluid mixture separation fiber membrane element, generally designated 10, having a construction in accordance with the principles of the present invention. Basically, the fiber membrane element 10 includes a support substrate 12 in the form of an elongated hollow transport artery 12, and a plurality of flexible hollow membrane fibers 14 connected in communication therewith. The hollow transport artery 12 of the membrane element 10 has an interior flow passage 16 and an exterior 18. The transport artery 12 is made of a non-permeable pressure-resistant material, such as metal or plastic.

Each flexible hollow membrane fiber 14 of the membrane element 10 have an internal flow channel 20 defined by the internal diameter of the fiber. Each hollow membrane fiber 14 is made from a suitable semi-permeable polymeric or ceramic membrane material, such as polymethylpentene (PTX) hollow fibers. In order to be mechanical stable, such hollow fibers must have a defined ratio of outside diameter (OD) to inside diameter (ID) falling within the range of from about 1.1 to 5. The smallest limit of the ratio is advantageous to eliminate backpressure effectively but is very non-resistant to pressure drop through the wall. The largest limit of the OD/ID ratio gives enhanced mechanical stability but backpressure effect increases dramatically. The OD/ID ratio is therefore determined by the mechanical strength of the membrane material. For example, for PTX fibers the OD/ID ratio can be about 1.25 since PTX fibers can have relatively thin walls and large inside diameters as this material has superior mechanical strength property.

However, for silicon fibers the OD/ID ratio must be about 2.5 since since silicon fibers need to have relatively thick walls small inside diameters as this material has poor mechanical strength property. The membrane fibers 14 can be employed in the various known membrane separation processes, namely, pervaporation, reverse osmosis, microfiltration, ultrafiltration, and nanofiltration as well as others and possible combinations of them.

The hollow fibers 14 can be characterized by an optimum relationship between the ratio of permeability (P) to wall thickness (l) and the effective lengths of the fibers (L). Permeability "P" is defined as the volume of the fluid flow in cubic centimeters ($cm^3$) per second (s) under normal temperature and pressure which is transported through the area of one square centimeter ($cm^2$) of membrane with thickness of the membrane wall of one centimeter under the driving force of one centimeter mercury (cm Hg) of partial or total pressure. The value "l" is the total thickness of the wall in centimeters. Using the P/l value the optimal characteristics of the hollow fibers to be applied in the design of the present invention can be effectively defined as falling within range of from $1 \times 10^{-6}$ to $1 \times 10^{-2}$ and preferably between $1 \times 10^{-5}$ to $1 \times 10^{-3}$ where P/l dimension is ($cm^3$/s $cm^2$ cm Hg). The hollow fiber has an effective length falling within the range of from about 0.2 to 100 centimeters, preferably between 1.5 to 78 centimeters, and most preferably between 1.5 to 12 centimeters.

Further, each hollow fiber 14 has a pair of spaced opposite end portions 22, 24 and an elongated tubular portion 26 extending between and interconnecting the opposite end portions 22, 24. The open opposite end portions 22, 24 of each hollow fiber 14 are attached by either an adhesive 28 or another suitable mechanism to the tubular transport artery 12 so as to provide flow communication between the internal flow channels 20 of the hollow fibers 14 and the interior flow passage 16 of the hollow transport artery 12. The separation process is realized by maintaining the total pressure of fluids in the internal flow passage 16 of the artery 12, and thus in the internal flow channels 20 of the hollow fibers 14, lower than that of the raw fluid sweeping over the outside extended surface of the hollow fibers 14 at the exterior 18 of the artery 12.

More particularly, as will be described hereafter with respect to the various embodiments of the membrane elements 10 illustrated in FIGS. 1 to 10, the hollow membrane fibers 14 can be variously arranged as individual hollow fibers, bundles of hollow fibers, knitted or wefted textiles, and fiber membrane carpets or rugs. The membrane elements 10 can be applied in separation processes individually, in parallel or in series arrangements, or in combined parallel and series arrangements. The hollow fibers can be placed in countercurrent, co-current and crossflow arrangements with the direction of flow of fluid feed streams. Each membrane fiber is self-supporting so there it is not necessary to apply additional material to protect collapse of the membrane fiber walls.

Referring again to FIGS. 1 to 3, there is illustrated the open opposite end portions 22, 24 of the hollow fibers 14 of the membrane elements 10 disposed in flow communication with the interior passage 16 of the transport artery 12 while the elongated portions 26 of the hollow fibers 14 extend in various configurations about the exterior 18 of the transport artery 12. In the embodiment of the membrane element 10 shown in FIG. 1, the hollow fibers 14 are formed as individual loops extending symmetrically about the exteriors of halves of the transport artery 12. The transport artery 12 has only a single interior flow passage 16. In the embodiment of the membrane element 10 shown in FIG. 2, the hollow fibers 14 are formed as individual loops extending symmetrically about the exteriors of quarters of the transport artery 12. Again, the transport artery 12 has only a single interior flow passage 16. In the embodiment of the membrane element 10 shown in FIG. 3, the arrangement is similar to that of the first embodiment of FIG. 1, but with the transport artery 12 having a pair of interior flow passages 16.

Figure 4:
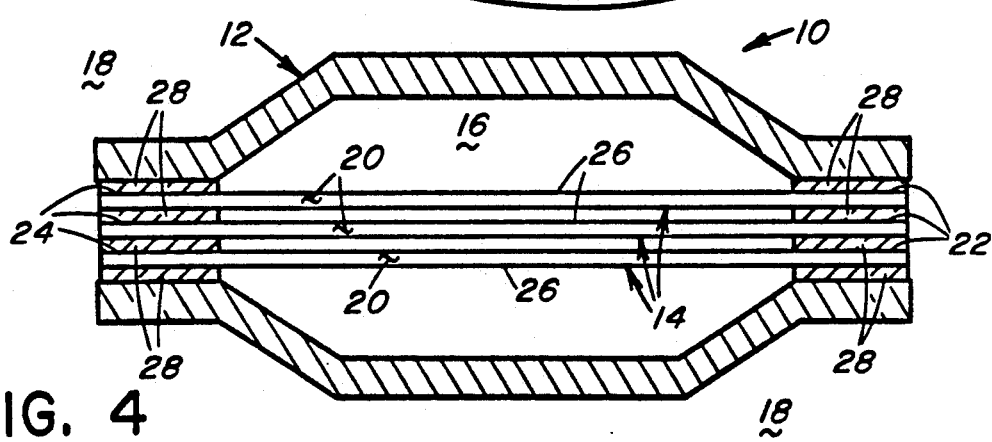
FIG. 4 is a diagrammatic cross-sectional view of a fourth embodiment of a fluid separation fiber membrane element of the present invention employing hollow fibers in the form of layers of fibers or a textile of fibers extending symmetrically across the interior of a flow passage of a transport envelope.
Figure 5:
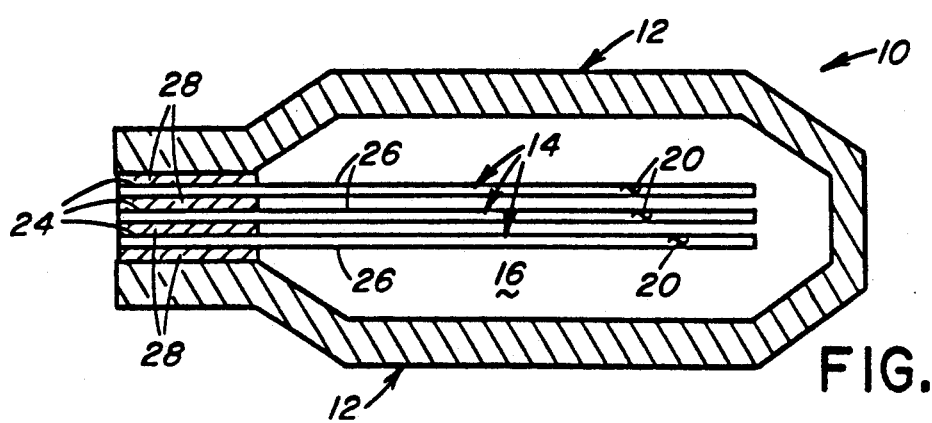
FIG. 5 is a diagrammatic cross-sectional view of a fifth embodiment of a fluid separation fiber membrane element of the present invention similar to the fourth embodiment of FIG. 4 but with hollow fibers extending asymmetrically across the interior of the transport envelope.

Referring to FIGS. 4 and 5, there is illustrated one or both of the opposite end portions 22, 24 of the hollow fibers 14 of the membrane element 10 being open and disposed in flow communication with the exterior 18 of the transport artery 12 while the elongated portions 26 of the hollow fibers 14 extend across the interior passage 16 of the transport artery 12. In the embodiment of the membrane element 10 shown in FIG. 4, the hollow fibers 14 are formed as either layers of fibers or as a textile of fibers extending across the interior of the flow passage 16 of the transport artery 12. The transport artery 12 is in the form of a symmetrically-shaped envelope. The open opposite end portions 22, 24 of the hollow fibers 14 are attached by either adhesive 28 or another suitable mechanism to the artery 12 so as to provide flow communication between the internal flow channel 20 of the hollow fibers 14 and the exterior 18 of the artery 12. In the embodiment of the membrane element 10 shown in FIG. 5, the hollow fibers 14 extend across the interior of the transport artery 12 which is in the form of an asymmetrically-shaped envelope. In this embodiment, the one end portions 22 of the hollow fibers 14 within the interior of the transport artery 12 is closed, while only the other end portions 24 of the hollow fibers 14 are open. The separation process is realized by maintaining the total pressure of the raw fluids at the exterior 18 of the artery 12, and thus inside the internal flow channels 20 of the hollow fibers 14, higher than that of the fluid inside of the internal flow passage 16 of the artery.

Figure 6A:
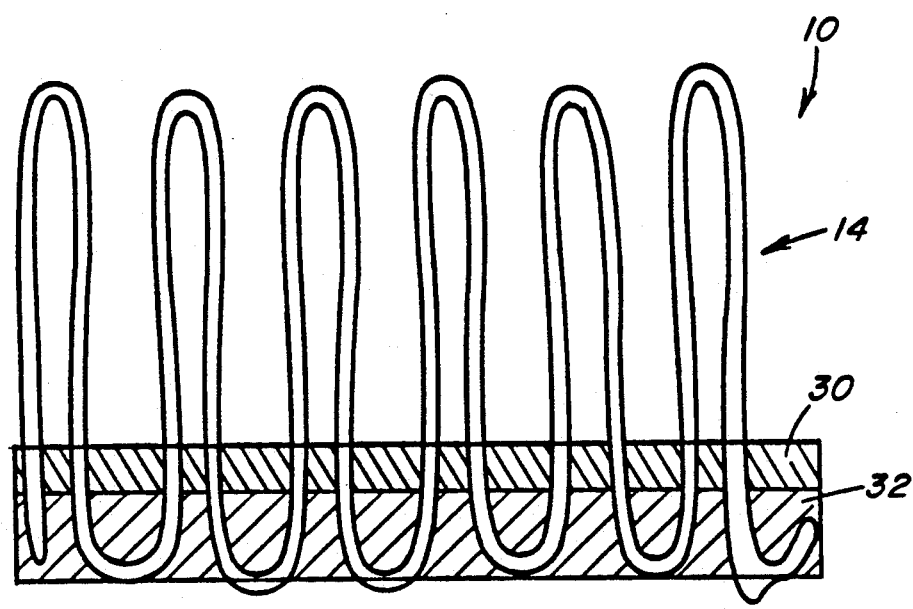
FIGS. 6A and 6B are diagrammatic cross-sectional views of steps in forming a sixth embodiment of a fluid separation fiber membrane element of the present invention employing hollow fibers formed as loops of individual hollow fibers, bundles of hollow fibers, or a hollow fiber textile in a hollow fiber membrane carpet.
Figure 6B:
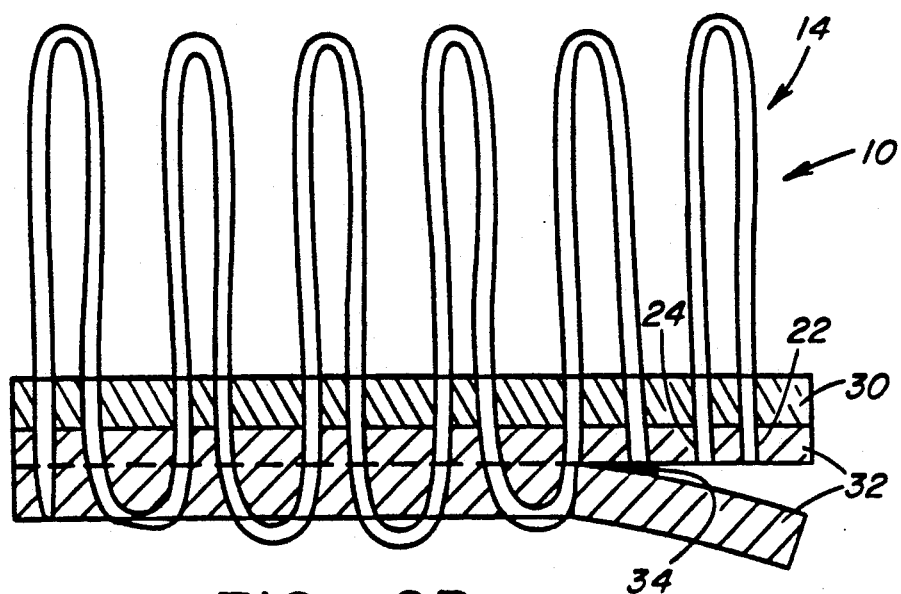
Figures 7, 8:
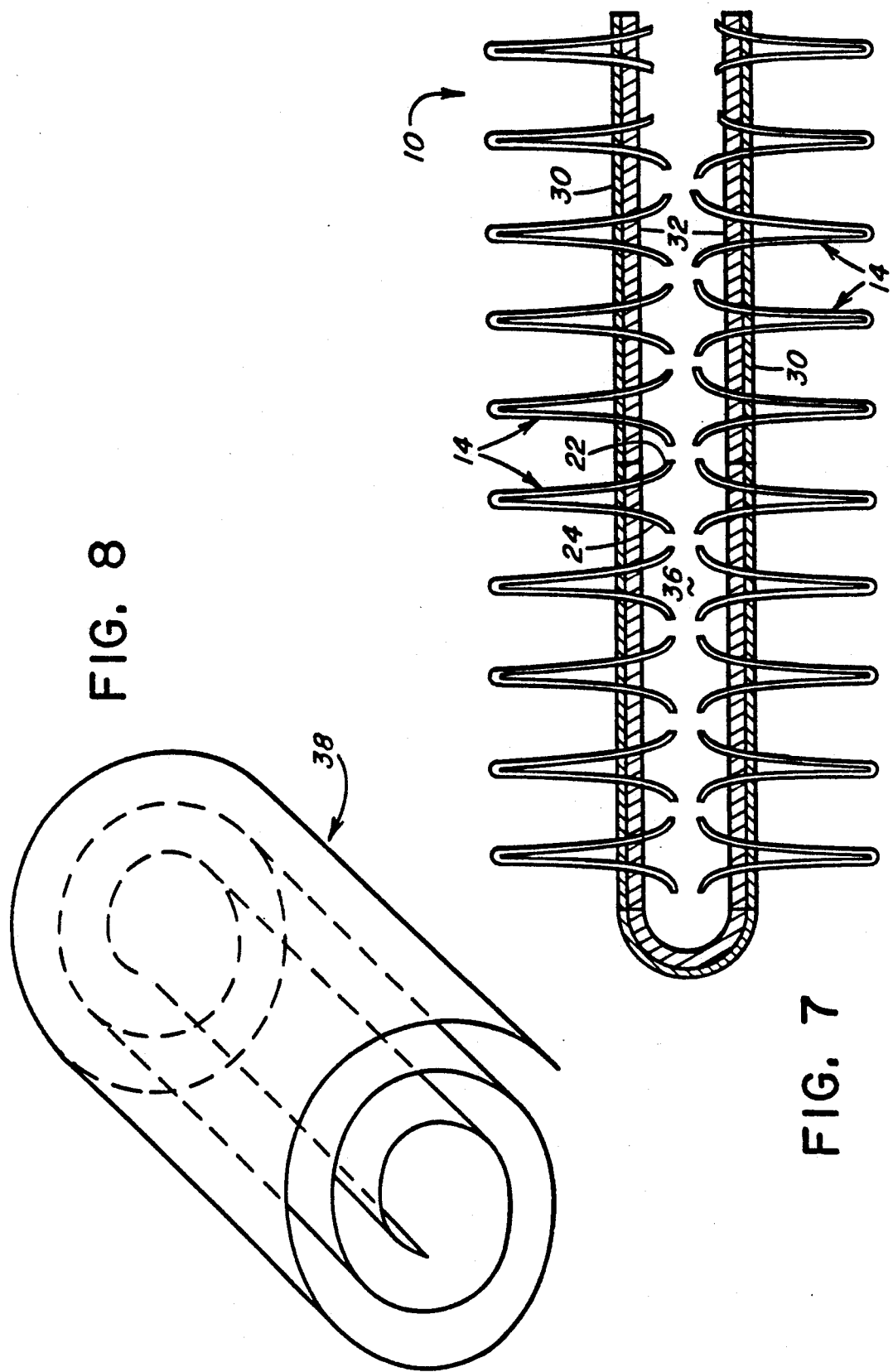
FIG. 7 is a diagrammatic cross-sectional view of a seventh embodiment of a fluid separation fiber membrane element of the present invention similar to the sixth embodiment of FIG. 6 but with the hollow fiber membrane carpet in the form of an envelope.
FIG. 8 is a diagrammatic perspective view of the hollow fiber membrane carpet of FIG. 7 rolled up into a multilayer membrane carpet envelope.

Referring to FIGS. 6 to 8, there is illustrated membrane elements 10 formed as carpets or rugs. In the embodiment of the membrane element 10 shown in FIGS. 6A and 6B, the hollow fibers 14 are formed as loops of individual hollow fibers, bundles of hollow fibers, or a hollow fiber textile as a hollow fiber membrane carpet 10. The arrangement of the hollow fibers 14 as the hollow fiber membrane carpet 10 is achieved generally by the modified application of known carpet manufacturing techniques.

As shown in FIG. 6A, portions of a continuous hollow fiber 14 is fixed inside two adhesive layers 30, 32. The adhesive of the first layer 30, such as silicon, has the desired sealing and elasticity properties, whereas the adhesive of the second layer 32, such as epoxide, has the desired stress resistant properties. As shown in FIG. 6B, after curing, part of the second layer 32 is removed with a sharp blade 34 or the like which opens the ends 22, 24 of the fibers 14.

In the embodiment of the membrane element 10 shown in FIG. 7, the hollow fibers 14 are formed similar to the sixth embodiment of FIG. 6 but with the hollow fiber membrane carpet folded into the form of an envelope 36 having an internal space. In FIG. 8, the hollow fiber membrane carpet of FIG. 7 is shown rolled up into a multilayer membrane carpet envelope 38.

Figure 9A:
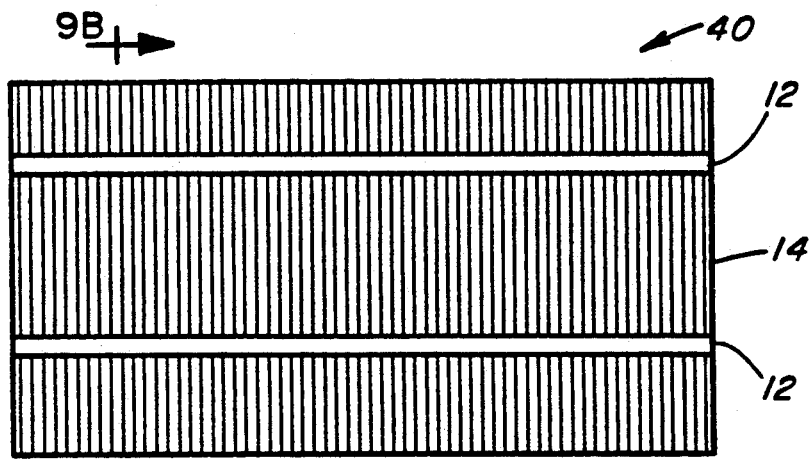
FIG. 9A is a plan view of a first embodiment of a sheet of fluid separation fiber membrane elements of the present invention employing hollow fibers in the form of layers of fibers or a textile of fibers extending between straight substrate structures.
Figure 9B:
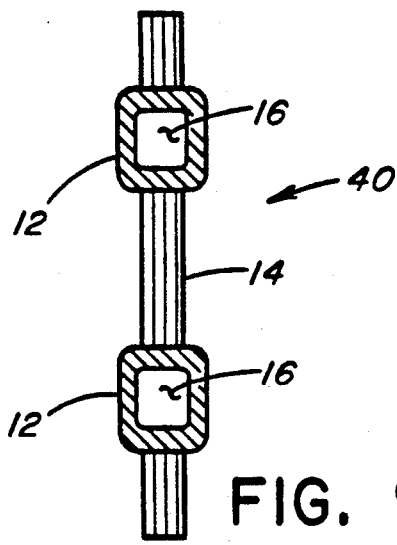
FIG. 9B is a cross-sectional view taken along line 9B—9B of FIG. 9A.
Figure 10:
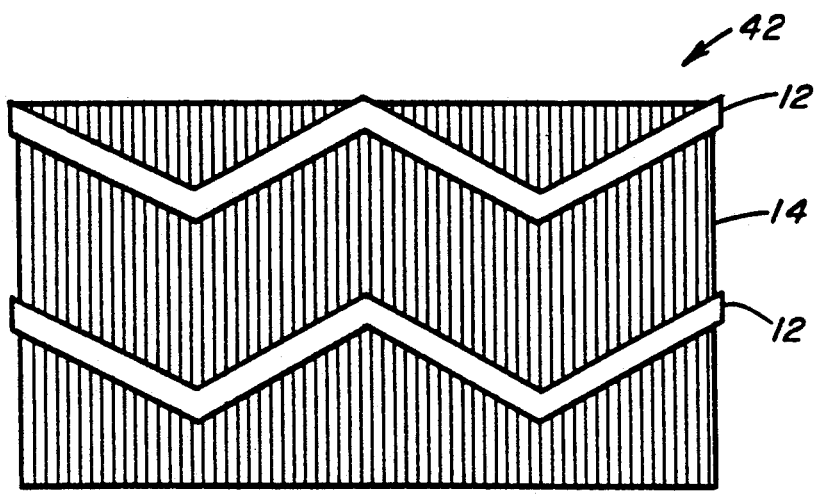
FIG. 10 is a plan view of a second embodiment of a sheet of fluid separation fiber membrane elements of the present invention employing hollow fibers in the form of layers of fibers or a textile of fibers extending between zig-zag substrate structures.

FIGS. 9A, 9B and 10 illustrate sheets 40, 42 of fluid separation fiber membrane elements of the present invention. In FIGS. 9A and 9B, the elements of the sheet 40 employ hollow fibers 14 in the form of layers of fibers or a textile of fibers extending between straight substrate structures 12 spaced from and extending parallel to one another and in transverse relation to the fibers. The structures 12 have the interior flow passage 16. In FIG. 10, the elements 10 of the sheet 42 employ hollow fibers 14 in the form of layers of fibers or a textile of fibers extending between substrate structures arranged in zig-zag relations.

FIBER MEMBRANE ELEMENT FABRICATING METHODS

Referring to FIGS. 11 to 14, the fiber membrane elements are fabricated by using various types of rotating, winding, and swinging methods. Basically, the fabricating method comprising the steps of (1) forming a continuous hollow fiber of fluid separation membrane material into a continuous bundle of hollow fiber strands 14 disposed side-by-side with one another, (2) forming at least one elongated support substrate or retention structure 12 in a predetermined pattern along the bundle of fiber strands 14 extending between axially spaced opposite ends of the bundle so as to encapsulate and support portions of the hollow fiber strands 14, and (3) severing the elongated retention structure 12 from one end to an opposite end thereof and thereby severing the portions of the hollow fiber strands 14 encapsulated by the retention structure so as to provide one or more retention structure portions encapsulating and supporting open opposite ends of the fiber strands 14.

Figure 11:
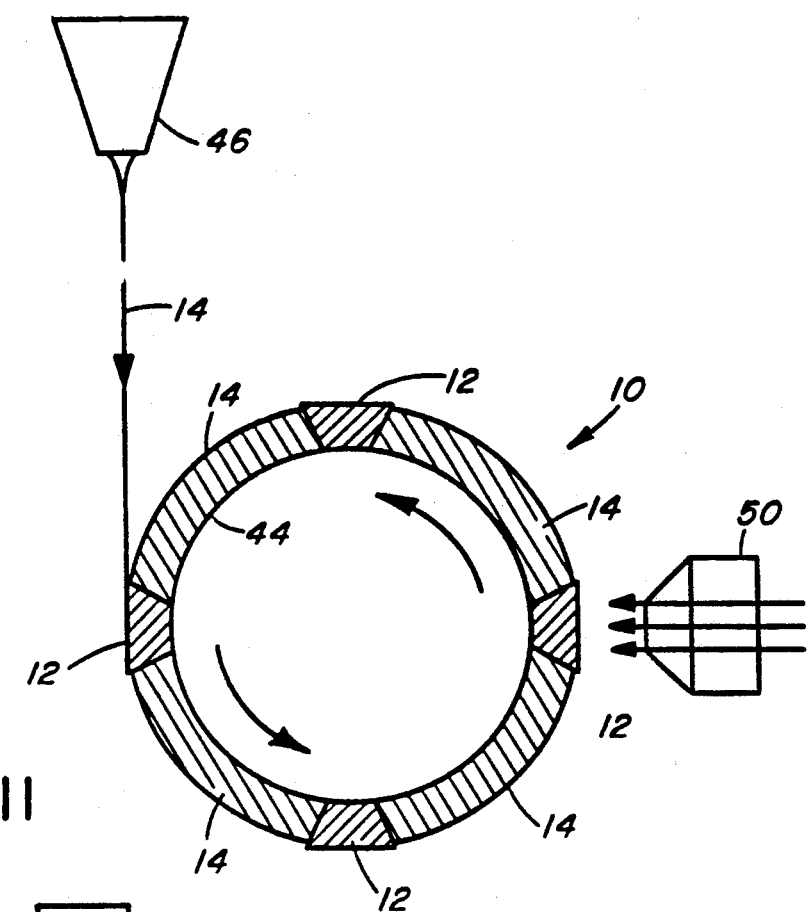
FIG. 11 is a diagrammatic cross-sectional view of a rotating cylinder system of the present invention for production of a sheet of fluid separation fiber membrane elements.
Figure 12:
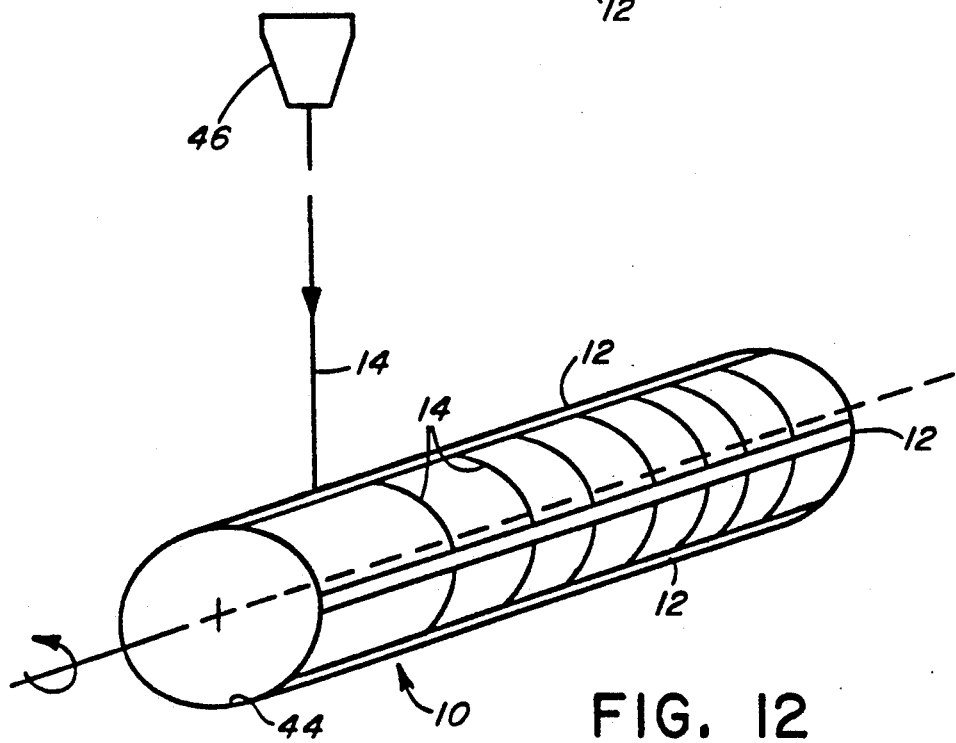
FIG. 12 is a diagrammatic perspective view of the system of FIG. 11.

In FIGS. 11 and 12, there is illustrated a rotating cylinder system of the present invention for production of the bundle of hollow fiber strands 14 as either a sheet or a tube of fluid separation fiber membrane elements 10. The bundle of hollow fiber strands 14 is formed by rotating a cylinder 44 and feeding the continuous hollow fiber 14 from a spinning head 46 to about the rotating cylinder 44. The hollow fiber is weaved continuously around the rotating cylinder 44 touching its external surface. The surface of the cylinder can be coated by Teflon or other nonadhesive material for easy removal of the membrane elements therefrom. Also, a tubular substrate can be slipped over the surface of the cylinder 44 and the hollow fibers then weaved continuously around the tube.

Figure 13:
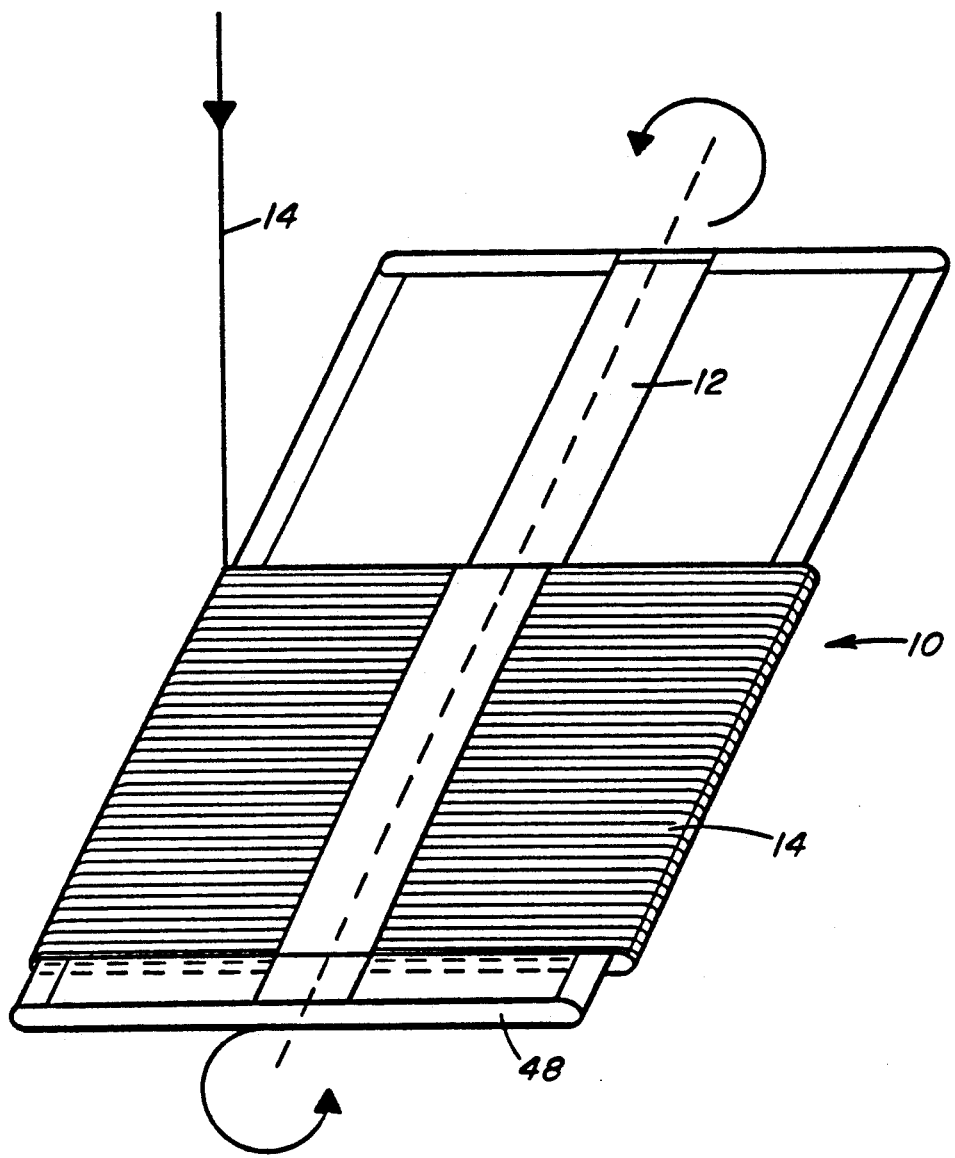
FIG. 13 is a diagrammatic perspective view of a rotating frame system of the present invention for production of a sheet of fluid separation fiber membrane elements.

In FIG. 13, there is illustrated a rotating frame system of the present invention for production of the bundle of hollow fiber strands 14 as either a sheet or envelope of fluid separation fiber membrane elements 10. The bundle of hollow fiber strands 14 is formed by rotating a rectangular frame 48 and feeding the continuous hollow fiber 14 about the rotating rectangular frame 48.

As shown in FIG. 11, but not shown in FIGS. 12 and 13, in both systems the retention structure 12 can be formed by applying a strip of an adhesive material, such as a glue layer or melted polymer layer, across the hollow fiber strands of the bundle between opposite ends thereof by moving an adhesive dispensing head or gun 50. The position and movement of the gun 50 can be precisely controlled. The strip of adhesive material can be applied in a substantially straight pattern or in a zig-zag pattern. The strip of adhesive material can be applied while the bundle of hollow fiber strands is rotating or during an interval when the rotation of the bundle is periodically halted. As an alternative, the retention structure 12 can be formed by applying heat, such as by scanning a laser beam, across the hollow fiber strands of the bundle between opposite ends thereof to cause partial melting of the portions of the hollow fiber strands such that the portions adhere to one another.

Figure 14:
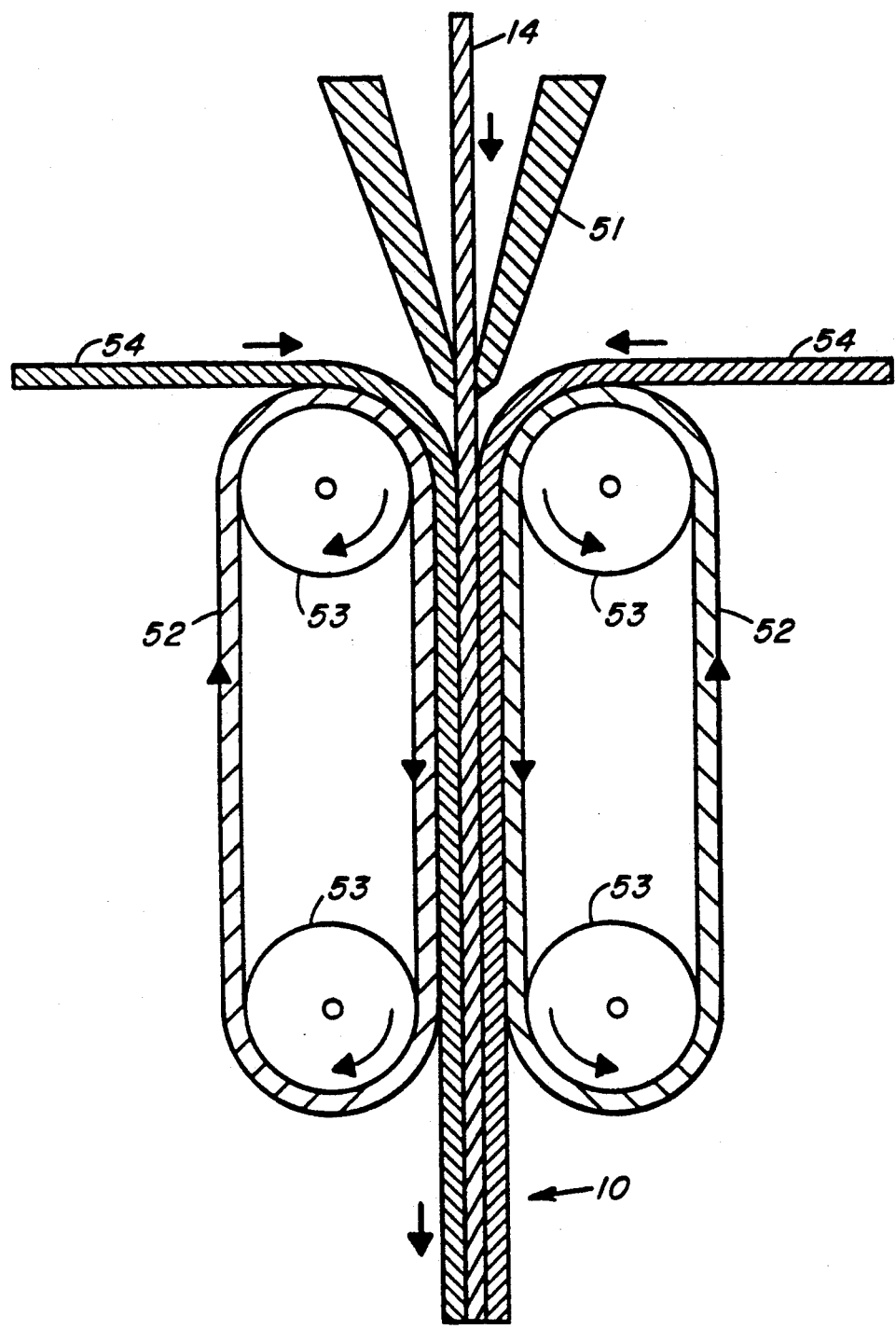
FIG. 14 is a diagrammatic cross-sectional view of a swinging system of the present invention for production of a sheet of fluid separation fiber membrane elements.

Referring to FIG. 14, there is illustrated a swinging system of the present invention for production of fluid separation fiber membrane elements 10 in the form of a hollow fiber membrane sandwich. In this production method, the bundle of hollow fiber strands 14 is formed by concurrently feeding and swinging a continuous hollow fiber 14 from side-to-side through a fiber directing nozzle 51 to form a plurality of endless parallel loops and collecting the plurality of endless parallel loops. The loops can be collected by rotating a pair of endless belts 52 entrained about spaced pairs of pulleys 53, transporting in parallel relation to one another a pair of elongated strips 54 of tape adhesively coated on surfaces facing toward one another, and then collecting the endless parallel loops between the strips of tapes 54. The strips 54 of adhesive tape can be in a linear pattern or in another desired pattern, such as a zig-zag pattern.

In another embodiment of the fabricating method, the retention structure is formed by applying heat across the hollow fiber strands of the bundle between opposite ends thereof to cause partial melting of the portions of the hollow fiber strands such that the portions become adhered to one another. The heat can be applied in any suitable manner, such as by a laser beam.

FLUID MIXTURE SEPARATION FIBER MEMBRANE MODULES

Referring to FIGS. 15 to 21, there are illustrated different embodiments of membrane modules 56 employing the membrane elements 10 of the present invention for separating a fluid mixture into permeate and retentate portions. Each membrane module 56 basically includes an elongated hollow casing 58 (not shown in some of the embodiments), one or more elongated support substrates 12, and a plurality of flexible hollow fibers 14 of semi-permeable membrane material. The casing 58 has a pair of opposite ends and a flow pathway 60 through the interior of the casing 58.

The support substrates 12 are hollow pressure-resistant non-permeable structures disposed in the casing 58 along opposite sides of the flow pathway 60 through the casing 58. The support substrate or substrates 12 longitudinally extend between the opposite ends of the casing and are spaced laterally from one another and define at least one transport passage along one of the support substrates being sealably isolated from the flow pathway through the casing.

As described earlier, the flexible hollow membrane fibers 14 define flow channels therethrough and are capable of separating a raw fluid mixture into permeate and retentate portions. Each hollow fiber 14 has a pair of spaced opposite end portions and an elongated portion extending between and interconnecting the opposite end portions. The opposite end portions of the hollow fibers 14 are attached to and encapsulated by the support substrate 12 such that the elongated portions of the hollow fibers are disposed within the flow pathway 60 of the casing in contact with of a fluid mixture flowing therethrough so as to provide flow communication of the permeate portion of the mixture from the pathway of the casing 58 through the fibers to and through the channels thereof to the transport passage 60 defined by the support substrate. The hollow fibers can be arranged in the various forms described earlier, such as individual hollow fibers, bundles of hollow fibers, knitted or wefted textiles, and fiber membrane carpets or rugs.

Figure 15:
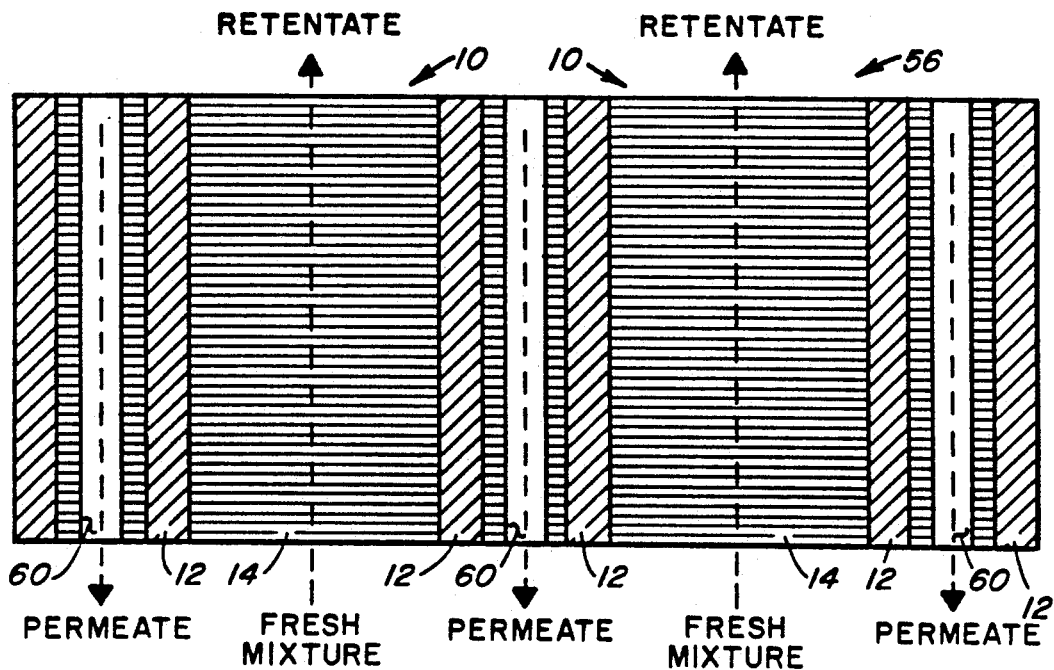
FIG. 15 is a diagrammatic longitudinal sectional view of a fluid separation fiber membrane module of the present invention employing fiber membrane elements severed from the sheet thereof shown in FIG. 9.
Figure 16:
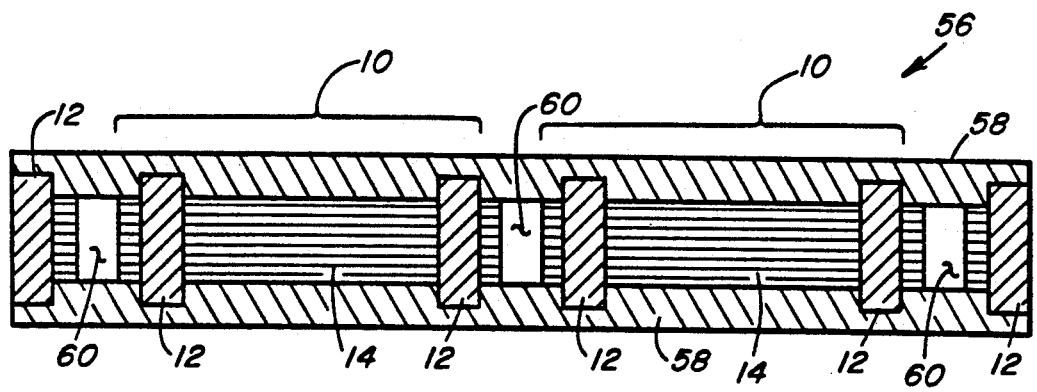
FIG. 16 is a diagrammatic cross-sectional view of the module of FIG. 15.
Figure 17:
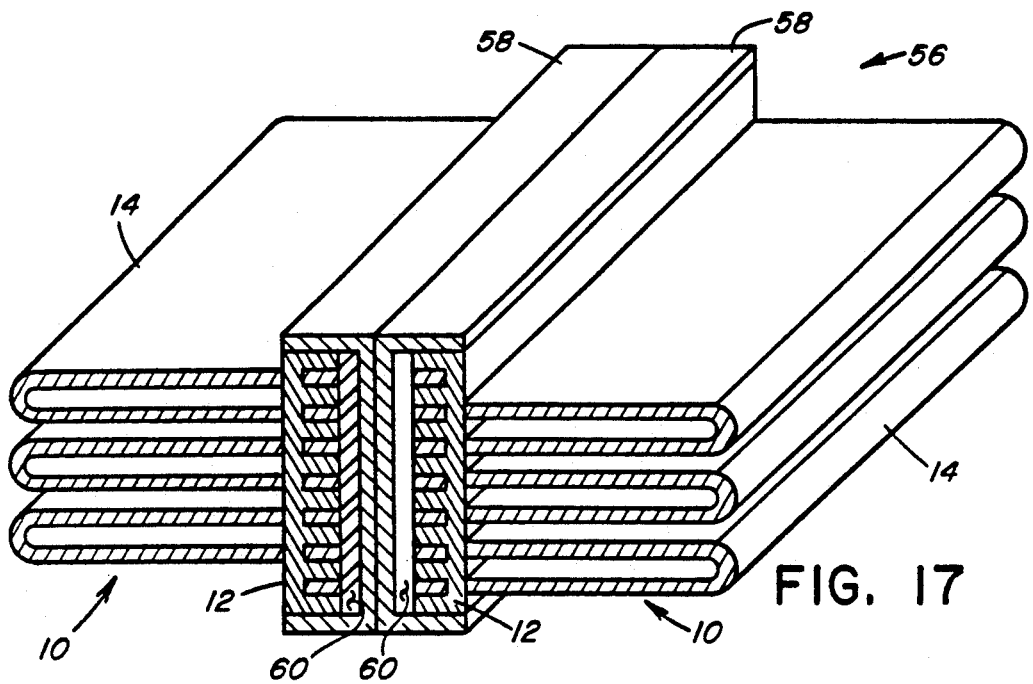
FIG. 17 is a diagrammatic perspective view of a fluid separation fiber membrane module employing fiber membrane elements in the form of layers of hollow fiber textile produced by a swinging textile system.
Figure 18:
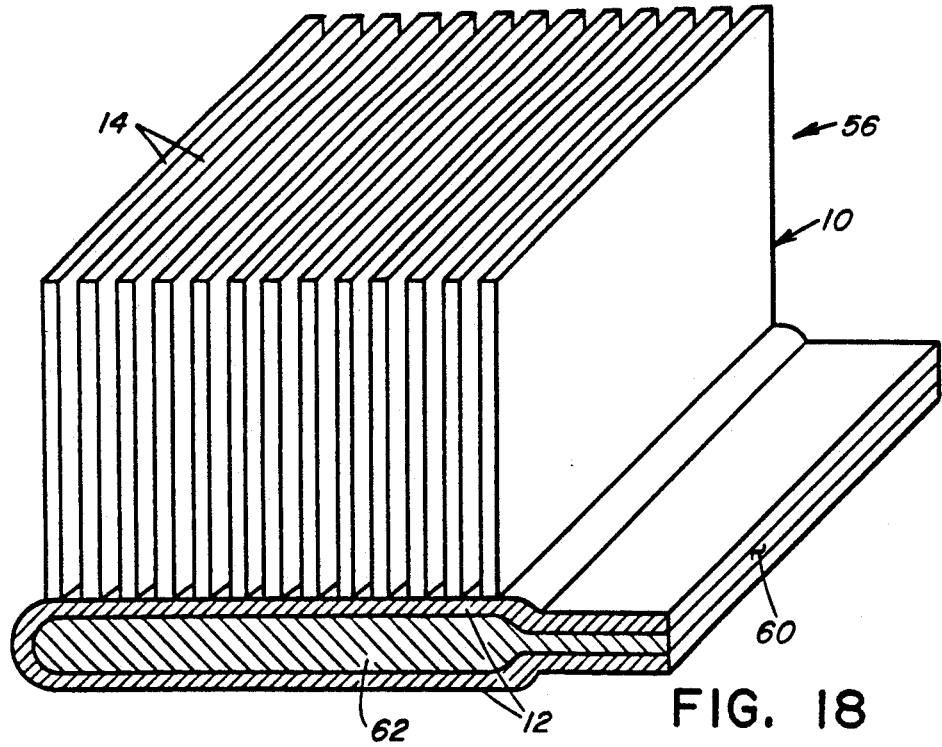
FIG. 18 is a diagrammatic perspective view of another fluid separation fiber membrane module of the present invention employing fiber membrane elements in the form of layers of hollow fibers or a textile of hollow fibers extending in carpet-like fashion from one side of a transport substrate.

FIGS. 15 and 16 illustrate a fluid separation fiber membrane module 56 employing fiber membrane elements 10 such as severed from the sheet thereof shown in FIG. 9. FIG. 17 illustrates a fluid separation fiber membrane module 56 employing layers of hollow fiber textile which elements are produced by a swinging textile system. FIG. 18 illustrates a fluid separation fiber membrane module 56 employing the hollow fiber membrane elements in the form of layers of hollow fibers or a textile of hollow fibers 14 extending in carpet-like fashion from one side of a transport substrate 12 shaped as an envelope with a high permeable stress resistant support 62 within the substrate 12.

Figure 19A:
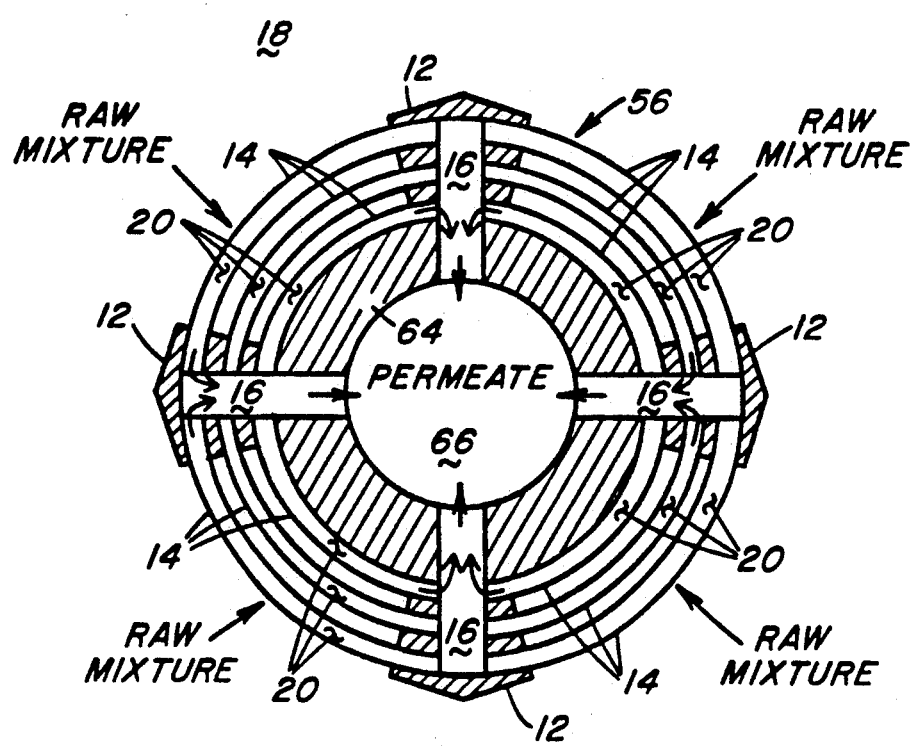
FIGS. 19A and 19B are diagrammatic cross-sectional views of two embodiments of another fluid separation fiber membrane module of the present invention employing fiber membrane elements in the form of individual fibers extending between transport substrates angularly displaced ninety degrees from one another around a non-perforated central support tube.
Figure 19B:
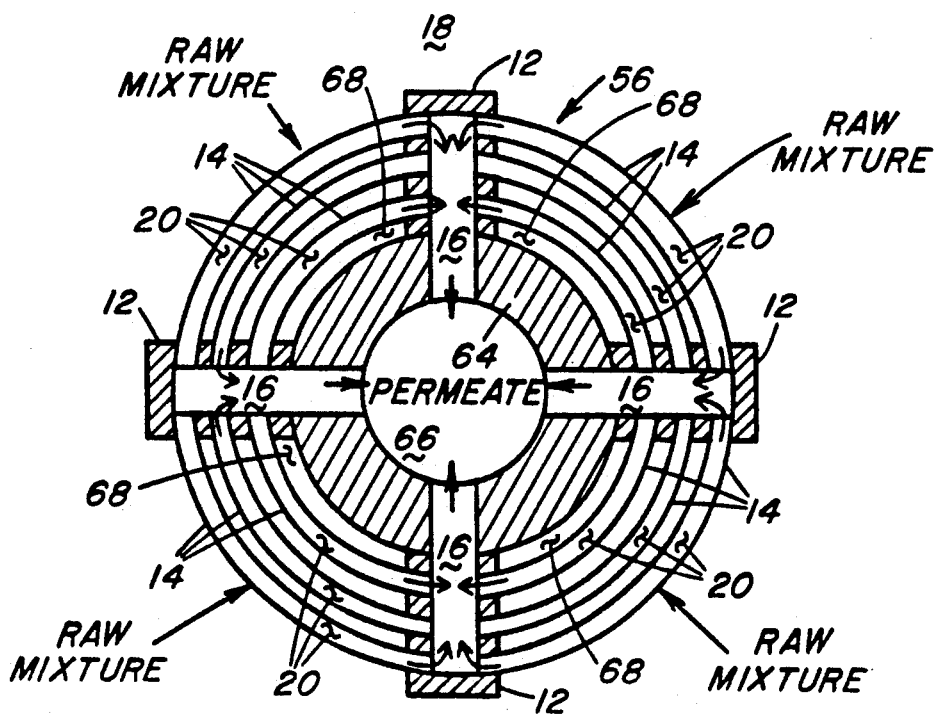
Figure 20A:
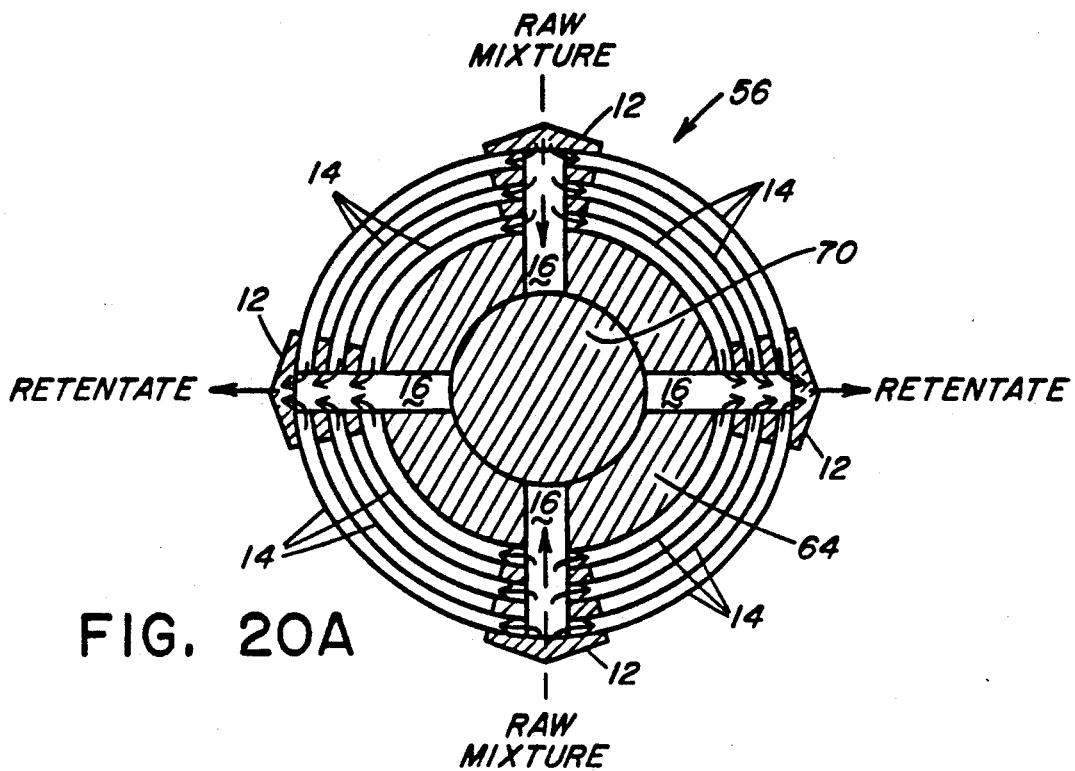
FIGS. 20A and 20B are diagrammatic cross-sectional views of modifications of the two embodiments of FIGS. 19A and 19B.
Figure 20B:
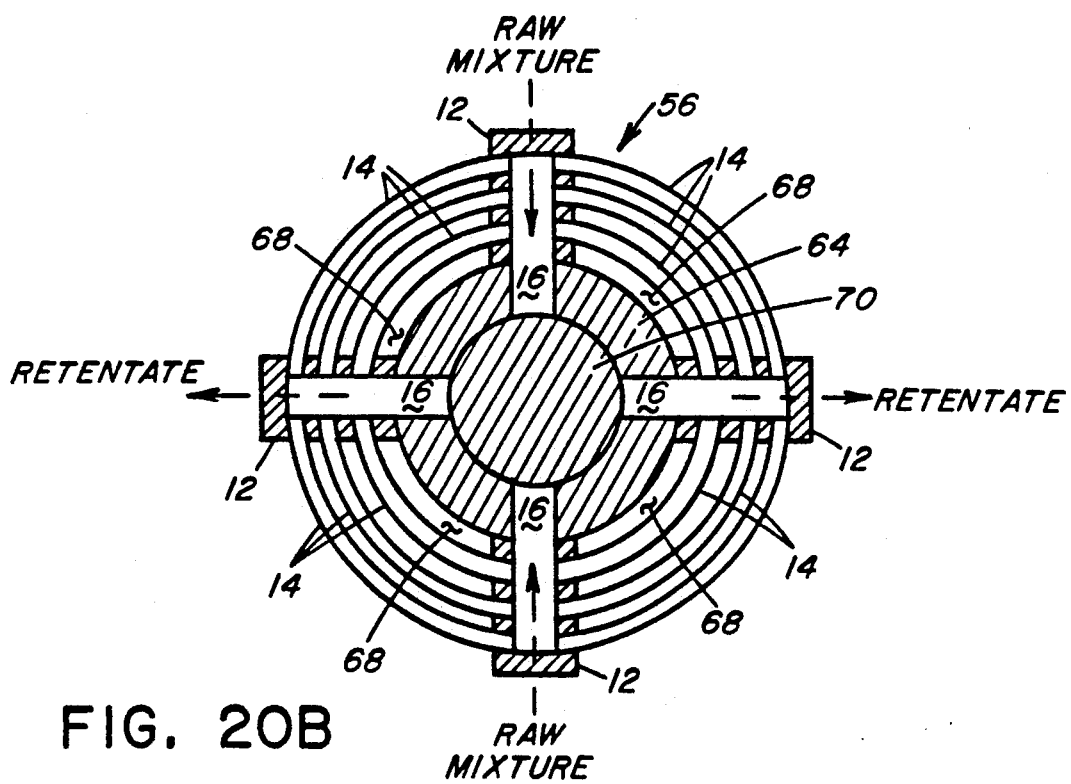

FIGS. 19A, 19B and FIGS. 20A, 20B illustrate a fluid separation fiber membrane module 56 employing fiber membrane elements in the form of individual fibers 14 extending between transport substrates 12 angularly displaced ninety degrees from one another around a non-perforated central support tube 64. In FIG. 19A, all internal channels 20 of the hollow fibers 14 are open to the central internal passage 66 of the central support tube 64 through the radial passages 16 of the transport substrates 12 such that permeate from the raw mixture at the exterior 18 of the modules 56 sweeping the fibers 14 follows the flow path of the arrows into the central internal passage 66. The module 56 of FIG. 19B works the same way and in addition it introduces additional flow passageways 68 for retentate removal after cross-filtration flow of raw mixture between the fibers. FIG. 20A is the same as FIG. 19A except that it introduces an elongated solid plug 70 which closes the central internal passage 66 of the tube 64. This alters the flow pattern of the adjacent pairs of radial passages 16 such that one acts as the feeding passage for raw mixture while the other serves as the removal passage for retentate. FIG. 20B is the same as the FIG. 19B except that it introduces the same modification as described above in FIG. 20A and now the additional flow passageways 68 are for permeate removal.

Figure 21A:
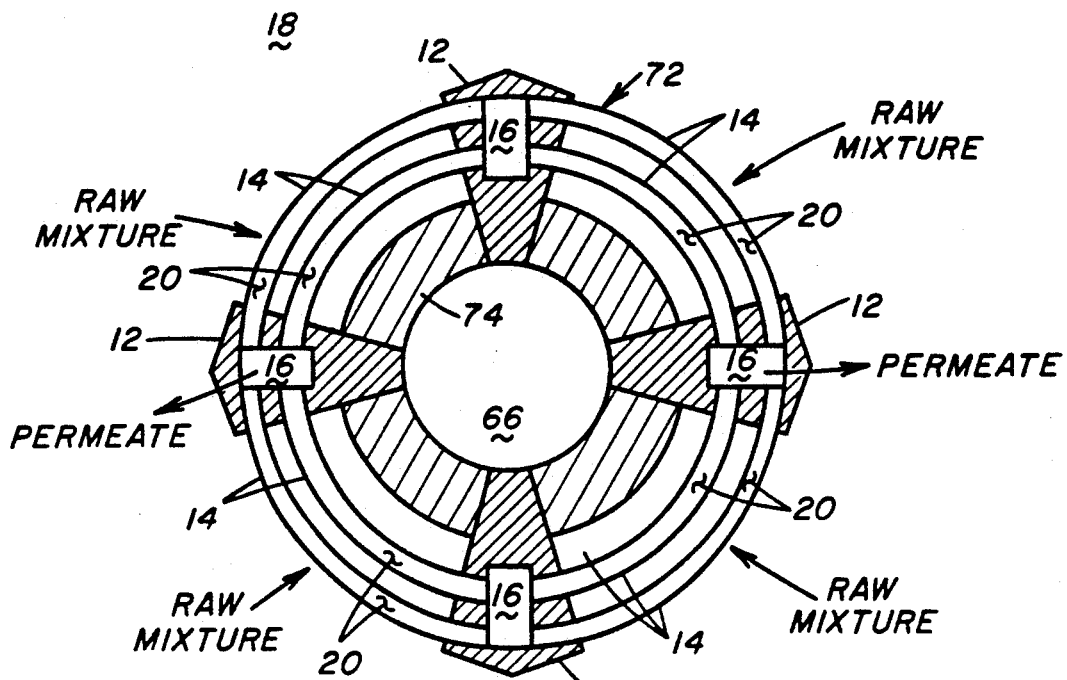
FIGS. 21A and 21B are diagrammatic cross-sectional views of two embodiments of still another fluid separation fiber membrane module of the present invention employing fiber membrane elements in the form of individual fibers extending between transport substrates angularly displaced ninety degrees from one another around a perforated central support tube.
Figure 21B:
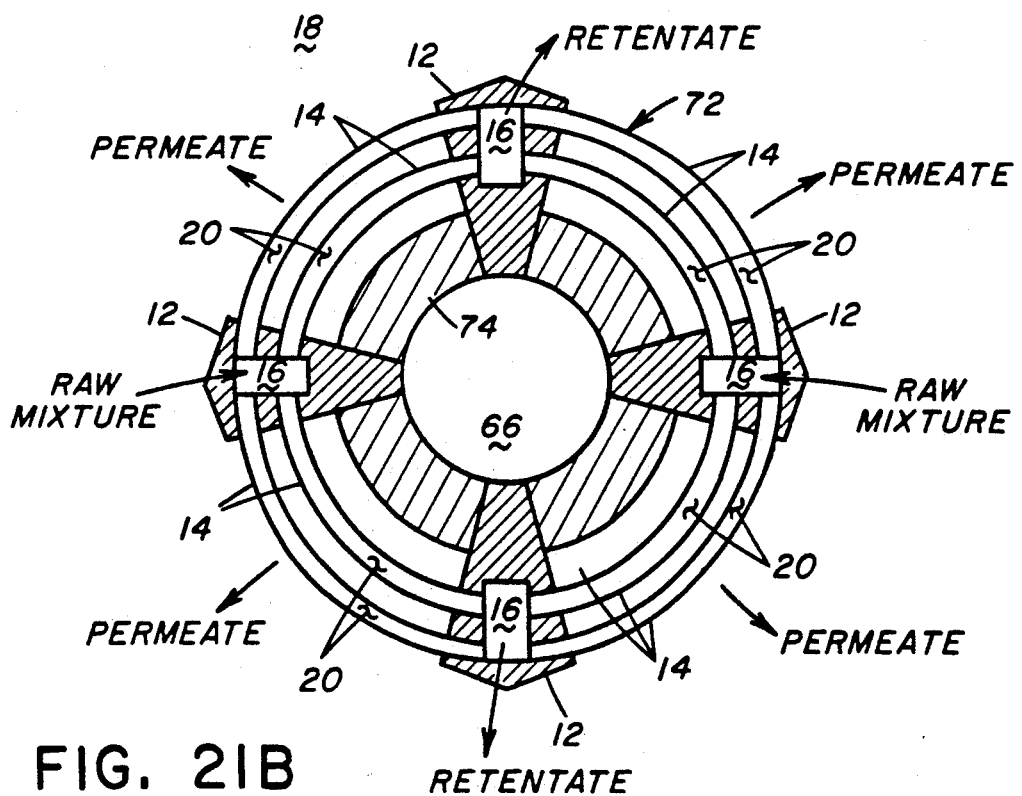

FIGS. 21A and 21B illustrate other fluid separation fiber membrane modules 72 employing fiber membrane elements in the form of individual fibers 14 extending between transport substrates 12 angularly displaced ninety degrees from one another around a central support tube 74 which in this embodiment is porous (which for purposes herein includes perforated) in the sense that fluid can flow easily through the wall of the support tube. In FIG. 21A, all internal channels 20 of the hollow fibers 14 are open to the radial passages 16 of the transport substrates 12 but are closed to central internal passage 66 of the perforated central support tube 74. The flow of raw mixture can be oriented from outside to inside of the perforated central support tube 74 or vice versa, to or from the central internal passage 66. In either case the raw mixture sweeps the exterior of the fibers 12 and the permeate emerges inside the fibers and is carried through the internal flow channels 20 of the hollow fibers 14 to the radial passages 16. The permeate is evacuated from the radial passages 16. In the external feeding mode of the module 72 shown in FIG. 21A, at least one radial passage 16 is necessary. The module 72 of FIG. 21B works with an internal feeding mode wherein raw mixture is introduced through the radial passages 16. In this case, at least two passages 16 are necessary because raw mixture enters one of the passages 16 and retentate must have a path for removal through the other of the passages 16.

EXAMPLE

The inventor herein carried out experiments using modules constructed in accordance with the design of FIG. 21A. The purpose of the experiments was to examine the influence of the lengths of the fibers on effectiveness of the modules defined as the level of oxygen concentration in permeate when fast flux of atmospheric air sweeps fibers from the outside. Thus, in these experiments it was assumed that the partial pressure of oxygen on the external surface of each individual hollow fiber is constant and equal to 20.8 percent of $O_2$. In all comparative experiments, the internal passages were connected to a vacuum pump which was strictly regulated to have the same value equal 30,000 MPa. The concentration of the oxygen in the streams leaving the vacuum pump was measured using an oxygen meter which shows the concentration in percentage of oxygen. The additional value measured was the flux produced from the vacuum pump. The experiments were carried out with three different hollow fiber membranes which were done from the same material, PTX, but were produced using different procedures giving different P/l values. It was estimated later that selectivity of all membranes to oxygen-nitrogen was similar and in the range of from 3.5 to 3.7. The basic characteristics of the membranes B, C, D are presented in Table I.

TABLE 1

| Basic Properties of Hollow Fibers Tested in Experiments | | | |
|---|---|---|---|
| Membrane | B | C | D |
| Material | TPX | TPX | TPX |
| Internal Diameter, d, ($10^{-6}$ m) | 50 | 55 | 34 |
| $(P/l)_{O_2}$ [cm$^3$/cm$^2$s cm Hg] | $5.5 \times 10^{-5}$ | $15.2 \times 10^{-5}$ | $1.6 \times 10^{-5}$ |
| ($O_2/N_2$) selectivity from permeation of pure gases [-] | 3.8 | 3.6 | 3.7 |
| Wall thickness, l, ($10^{-6}$ m) (from microphotos) | 10–12 | 8–10 | 9–10 |

TPX - Polymethylpentene from Mitsui, Japan

Figure 22:
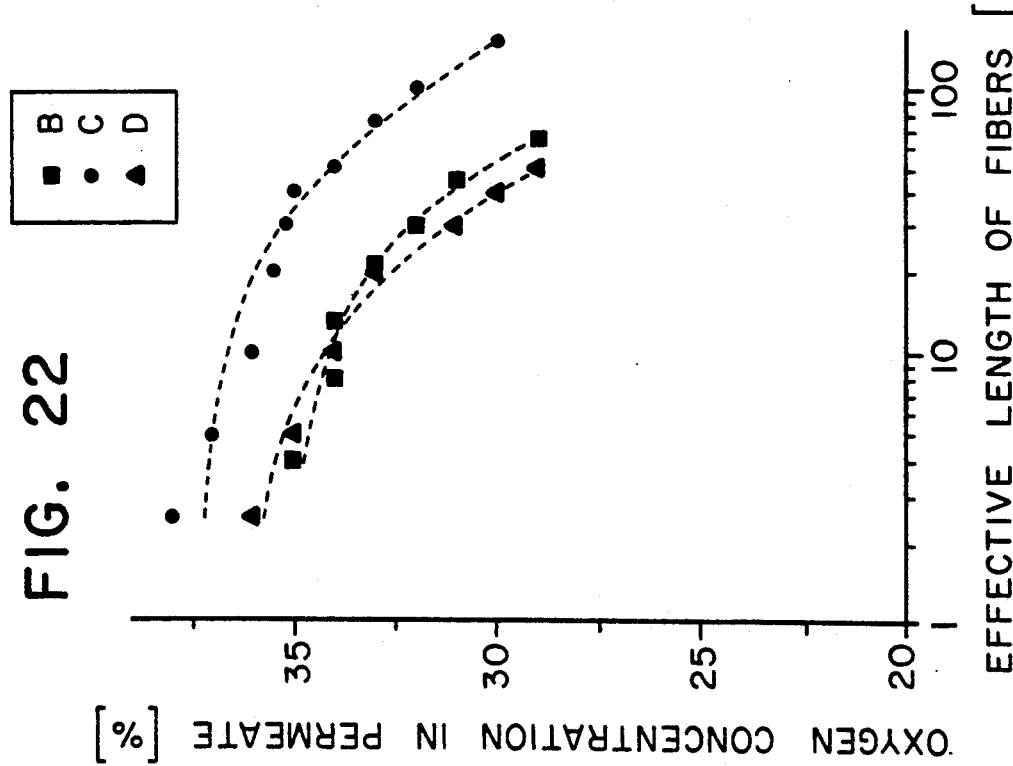
FIG. 22 is a graph of experimental data showing oxygen concentration in permeate as a function of the effective length of the hollow fibers characterized by different P/l values.

The experiments were carried out with different lengths of the fibers connecting the radial passage 16 of the module 72 shown in FIG. 21A. The results are presented in the graph of FIG. 22 as the equilibrium oxygen concentration in permeate as a function of the effective length of the hollow fibers characterized by different P/l values. The graph of FIG. 23 displays the productivity of the modules as a function of the effective length of the hollow fibers characterized by different P/l values. The productivity was calculated from the oxygen concentration in permeate (% by volume) and from permeate flow data (Ncm3/s). The productivity was defined according to the relation: Productivity = ($O_2$ concentration in permeate [%] − $O_2$ in raw stream 20.8%) x flux of permeate divided by total surface area in module with specified lengths. The relative productivity in percentage value presented in FIG. 23 was obtained by relating the productivity for actual lengths to the best productivity of the actual type of the fibers being tested in the experiments. The reasons for seeing some maxima in the location of experimental points is the influence of the glue layer thickness which influences the backpressure effect but does not add the permeate stream to the observed flux. It was found in additional experiments that the thickness of the glue layer is important parameter when one works with very short and very highly productive fibers. It those cases, the carpet design which has a relatively very thin layer of glue will be the best design. That effect is especially important when the module is used with external feeding and driving force goes from vacuum connected to internal side.

Figure 23:
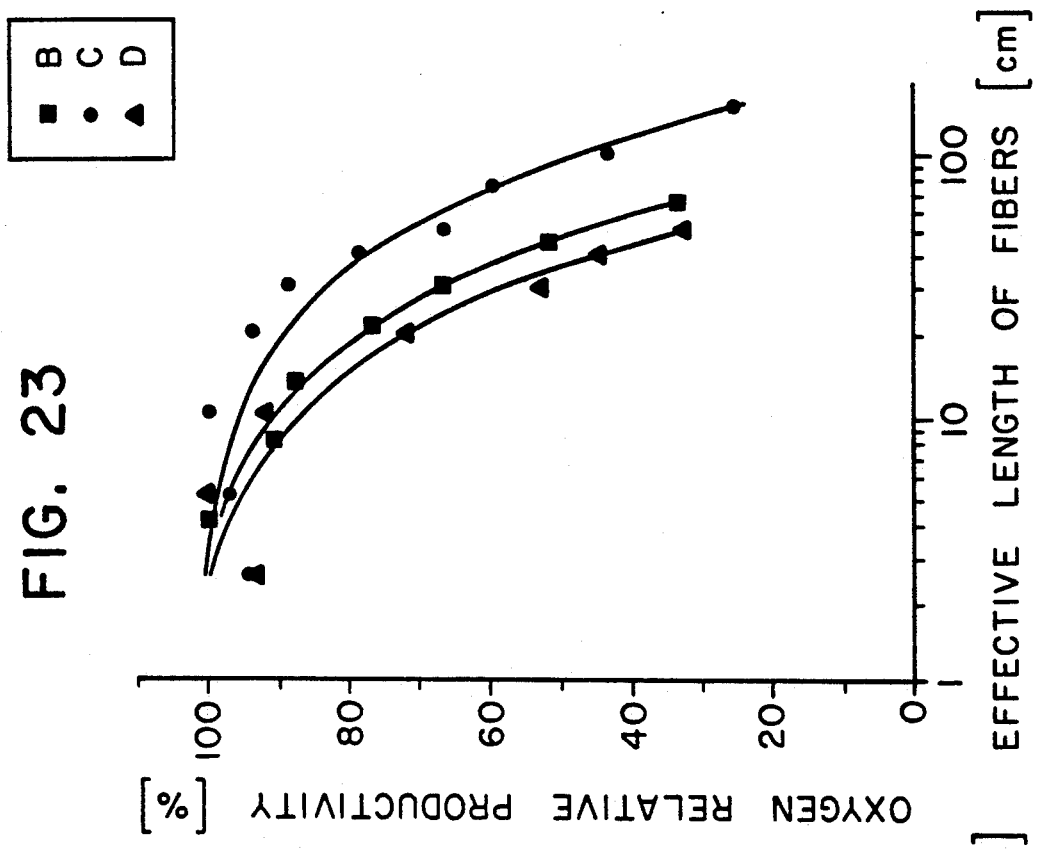
FIG. 23 is a graph of experimental data showing oxygen relative productivity as a function of the effective length of the hollow fibers characterized by different P/l values.

It follows from the graphs presented in FIG. 23 that when the productivity of hollow fiber membranes changes all the optimal range of effective lengths of the fibers changes. To be more specific assuming an eighty percent of oxygen relative productivity, it is seen that when P/l increases about fifteen times between fibers D and C. The optimal range of the effective lengths extends from about 10 cms to more than 40 cms. This shows why the alternative way of characterizing the optimal properties of the fibers to be used according to the present invention is valid.

INDUSTRIAL APPLICABILITY

The largest area of industrial application of the fiber membrane elements 10 and modules 56 of the present invention are in the process of oxygen-enriched air production on a low cost basis. By using the invention herein to increase the concentration of oxygen to 30-40% (compared to 20% for normal air), the energy saving of burning will be increased at least 30% over normal air. The oxygen-enriched air also has application in increasing the rate of biotechnological and waste water cleaning processes. On the other hand, nitrogen-enriched air also produced by the invention has many applications. The most important application is as the source of nitrogen for controlled atmosphere generation in food storage and production of inert gas in enhanced oil production. In food storage, by exchanging the normal air to nitrogen-enriched air (97% of nitrogen) not only is storage time of food extended but also the storage temperature can be substantially raised, which will result in a significant increase in energy effectiveness. It should also be understood that the fiber membrane elements 10 and modules 56 of the present invention can be applied in existing membrane applications, such as hydrogen removal from different sources and carbon dioxide removal from natural gas, with corresponding increased effectiveness.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A membrane element for separating a fluid mixture into permeate and retentate portions, said membrane element comprising:
   (a) a support substrate including at least one elongated hollow pressure-resistant non-permeable tubular transport artery having an interior and an exterior;
   (b) a plurality of flexible hollow fibers of semipermeable membrane material defining flow channels therethrough and being capable of separating a raw fluid mixture into permeate and retentate portions, each of said hollow fibers having a pair of spaced opposite end portions and an elongated portion extending between and interconnecting said opposite end portions, at least one of said opposite end portions being open, each of said hollow fibers having a ratio of permeability (P) to total wall thickness (l) falling within the range of from $1 \times 10^{-6}$ to $1 \times 10^{-2}$ where the ratio P/l is in (cm$^3$/s cm$^2$ cm Hg), each of said hollow fibers also having an effective length falling within the range of from about 0.2 to 100 centimeters; and
   (c) means for attaching said at least one open opposite end portion of each of said hollow fibers to said transport artery so as to provide flow communication between said channels of said hollow fibers and one of said interior or exterior of said transport artery.

2. The membrane element of claim 1 wherein both of said opposite end portions of said hollow fibers are open and attached to said transport artery.

3. The membrane element of claim 1 wherein:
   said support substrate includes a pair of said transport arteries; and
   both of said opposite end portions of said hollow fibers are open and attached to different ones of said transport arteries.

4. The membrane element of claim 1 wherein said ratio of permeability (P) to total wall thickness (l) of each said hollow fiber preferably falls within the range of from about $1 \times 10^{-5}$ to $1 \times 10^{-3}$.

5. The membrane element of claim 1 wherein said length of each said hollow fiber preferably falls within the range of from about 1.5 to 78 centimeters.

6. The membrane element of claim 1 wherein said length of each said hollow fiber preferably falls within the range of from about 1.5 to 12 centimeters.

7. The membrane element of claim 1 wherein said hollow fibers are arranged as individual hollow fibers.

8. The membrane element of claim 1 wherein said hollow fibers are arranged in a bundle of said hollow fibers.

9. The membrane element of claim 1 wherein said hollow fibers are arranged in a woven textile made of said hollow fibers.

10. The membrane element of claim 1 wherein said hollow fibers are arranged in a carpet made of said hollow fibers.

11. The membrane element of claim 1 wherein said open opposite end portions of said hollow fibers are disposed in flow communication with said interior of said transport artery and said elongated portions of said hollow fibers extend about said exterior of said transport artery.

12. The membrane element of claim 1 wherein said open opposite end portions of said hollow fibers are disposed in flow communication with said exterior of said transport artery and said elongated portions of said hollow fibers extend across said interior of said transport artery.

13. A membrane element for separating a fluid mixture into permeate and retentate portions, said membrane element comprising:
   (a) an elongated pressure-resistant non-permeable support substrate having opposite sides;
   (b) a plurality of flexible hollow fibers of semipermeable membrane material defining flow channels therethrough and being capable of separating a raw fluid mixture into permeate and retentate portions, each of said hollow fibers having a pair of spaced opposite end portions and an elongated portion extending between and interconnecting said opposite end portions, at least one of said opposite end portions being open, each of said hollow fibers having a ratio of permeability (P) to total wall thickness (l) falling within the range of from $1 \times 10^{-6}$ to $1 \times 10^{-2}$ where the ratio P/l is in (cm$^3$/s cm$^2$ cm Hg), each of said hollow fibers also having an effective length falling within the range of from about 0.2 to 100 centimeters; and (c) means for attaching said at least one open opposite end portion of each of said hollow fibers to said support substrate so as to provide flow communication between said channels of said hollow fibers and one of said opposite sides of said support substrate.

14. The membrane element of claim 13 wherein both of said opposite end portions of said hollow fibers are open and attached to said support substrate.

15. The membrane element of claim 13 wherein said ratio of permeability (P) to total wall thickness (l) of each said hollow fiber preferably falls within the range of from about $1 \times 10^{-5}$ to $1 \times 10^{-3}$.

16. The membrane element of claim 13 wherein said length of each said hollow fiber preferably falls within the range of from about 1.5 to 78 centimeters.

17. The membrane element of claim 13 wherein said length of each said hollow fiber preferably falls within the range of from about 1.5 to 12 centimeters.

18. The membrane element of claim 13 wherein said hollow fibers are arranged as individual hollow fibers.

19. The membrane element of claim 13 wherein said hollow fibers are arranged in a bundle of said hollow fibers.

20. The membrane element of claim 13 wherein said hollow fibers are arranged in a woven textile made of said hollow fibers.

21. The membrane element of claim 13 wherein said support substrate is part of a carpet made of said hollow fibers.

22. The membrane element of claim 13 wherein said opposite end portions of said hollow fibers are disposed in flow communication with one of said opposite sides of said support substrate and said elongated portions of said hollow fibers extend away the other of said opposite sides of said support substrate.

23. The membrane element of claim 22 wherein said elongated portions of said hollow fibers are in the shape of loops.

24. A membrane element for separating a fluid mixture into permeate and retentate portions, said membrane element comprising:

(a) an elongated hollow pressure-resistant nonpermeable support substrate having an interior and an exterior;

(b) a plurality of flexible hollow fibers of semipermeable membrane material defining flow channels therethrough and being capable of separating a raw fluid mixture into permeate and retentate portions, each of said hollow fibers having a pair of spaced opposite end portions and an elongated tubular portion extending between and interconnecting said opposite end portions, at least one of said opposite end portions being open, each of said hollow fibers having a ratio of permeability (P) to total wall thickness (l) falling within the range of from $1 \times 10^{-6}$ to $1 \times 10^{-2}$ where the ratio P/l is in (cm$^3$/s cm$^2$ cm Hg), each of said hollow fibers also having an effective length falling within the range of from about 0.2 to 100 centimeters; and (c) means for attaching at least said open one of said opposite end portions of said hollow fibers to said support substrate so as to provide flow communication between said channels of said hollow fibers and one of said interior or exterior of said support substrate.

25. The membrane element of claim 24 wherein said ratio of permeability (P) to total wall thickness (l) of each said hollow fiber preferably falls within the range of from about $1 \times 10^{-5}$ to $1 \times 10^{-3}$.

26. The membrane element of claim 24 wherein said length of each said hollow fiber preferably falls within the range of from about 1.5 to 78 centimeters.

27. The membrane element of claim 24 wherein said length of each said hollow fiber preferably falls within the range of from about 1.5 to 12 centimeters.

28. The membrane element of claim 24 wherein said hollow fibers are arranged as individual hollow fibers.

29. The membrane element of claim 24 wherein said hollow fibers are arranged in a bundle of said hollow fibers.

30. The membrane element of claim 24 wherein said hollow fibers are arranged in a textile made of said hollow fibers.

31. The membrane element of claim 24 wherein said support substrate is part of a carpet made of said hollow fibers.

32. The membrane element of claim 24 wherein said open opposite end portions of said hollow fibers are disposed in flow communication with said interior of said support substrate and said elongated portions of said hollow fibers extend about said exterior of said support substrate.

33. The membrane element of claim 24 wherein said open opposite end portions of said hollow fibers are disposed in flow communication with said exterior of said support substrate and said elongated portions of said hollow fibers extend across said interior of said support substrate.

34. A method for fabricating a membrane element capable of separating a fluid mixture into permeate and retentate portions, said fabricating method comprising the steps of:

(a) providing a continuous hollow fiber of fluid separation membrane material having a ratio of permeability (P) to total wall thickness (l) falling within the range of from $1 \times 10^{-6}$ to $1 \times 10^{-2}$ where the ratio P/l is in (cm$^3$/s cm$^2$ cm Hg);

(b) forming the continuous hollow fiber into a continuous bundle of hollow fiber strands disposed side-by-side with one another;

(c) forming at least one elongated retention structure in a predetermined pattern along the bundle of fiber strands extending between axially spaced opposite ends of the bundle so as to encapsulate and support portions of the hollow fiber strands; and (d) severing the elongated retention structure from one end to an opposite end thereof and thereby severing the portions of the hollow fiber strands encapsulated by the retention structure so as to provide at least one retention structure portion encapsulating and supporting open opposite ends of the fiber strands and to provide the severed hollow fiber strands with effective lengths falling within the range of from about 0.2 to 100 centimeters.

35. The fabricating method of claim 34 wherein said ratio of permeability (P) to total wall thickness (l) of each said hollow fiber preferably falls within the range of from about $1 \times 10^{-5}$ to $1 \times 10^3$.

36. The fabricating method of claim 34 wherein said length of each said hollow fiber preferably falls within the range of from about 1.5 to 78 centimeters.

37. The fabricating method of claim 34 wherein said length of each said hollow fiber preferably falls within the range of from about 1.5 to 12 centimeters.

38. The fabricating method of claim 34 wherein said forming said bundle of hollow fiber strands includes:
rotating a cylindrical mandrel; and
feeding said continuous hollow fiber about said rotating cylindrical mandrel.

39. The fabricating method of claim 34 wherein said forming said bundle of hollow fiber strands includes:
rotating a rectangular frame; and
feeding said continuous hollow fiber about said rotating rectangular frame.

40. The fabricating method of claim 34 wherein said forming said bundle of hollow fiber strands includes:
concurrently feeding and swinging said continuous hollow fiber from side-to-side to form a plurality of endless parallel loops; and
collecting said plurality of endless parallel loops.

41. The fabricating method of claim 34 wherein said forming said bundle of hollow fiber strands also includes:
rotating a pair of endless belts;
transporting in parallel relation to one another a pair of elongated strips of tape being adhesively coated on surfaces of the tape strips facing toward one another; and
collecting said endless parallel loops between said strips of tapes.

42. The fabricating method of claim 34 wherein said forming of said retention structure includes applying a strip of an adhesive material across said hollow fiber strands of said bundle between opposite ends thereof.

43. The fabricating method of claim 42 wherein said strip of adhesive material is applied in a linear pattern.

44. The fabricating method of claim 42 wherein said strip of adhesive material is applies in a zig-zag pattern.

45. The fabricating method of claim 34 wherein said forming of said retention structure includes applying heat across said hollow fiber strands of said bundle between opposite ends thereof to cause partial melting of said portions of said hollow fiber strands such that said portions adhere to one another.

46. The fabricating method of claim 45 wherein said heat is applied by a laser beam.

47. The fabricating method of claim 34 wherein forming of said retention structure includes:
rotating said bundle of hollow fiber strands;
periodically halting the rotating of said bundle; and
applying a strip of an adhesive material across said hollow fiber strands of said bundle between opposite ends thereof during intervals when said rotating of said bundle is halted.

48. A membrane module for separating a fluid mixture into permeate and retentate portions, said membrane module comprising:
(a) an elongated hollow casing having a pair of opposite ends and a flow pathway through the interior of said casing;
(b) at least one elongated hollow pressure-resistant non-permeable support substrate disposed in said casing along said flow pathway through said casing, said support substrate extending longitudinally between said opposite ends of said casing and defining at least one transport passage along said support substrate being sealably isolated from said flow pathway through said casing; and
(c) a plurality of flexible hollow fibers of semipermeable membrane material defining flow channels therethrough and being capable of separating a raw fluid mixture into permeate and retentate portions, each of said hollow fibers having a pair of spaced open opposite end portions and an elongated portion extending between and interconnecting said opposite end portions, said opposite end portions of said hollow fibers being attached to said support substrate such that said elongated portions of said hollow fibers are disposed within said flow pathway of said casing in contact with of a fluid mixture flowing therethrough so as to provide flow communication of the permeate portion of the mixture from the pathway of said casing through said fibers to and through said channels thereof to said transport passage defined by said support substrate, each of said hollow fibers having a ratio of permeability (P) to total wall thickness (l) falling within the range of from $1 \times 10^{-6}$ to $1 \times 10^{-2}$ where the ratio P/l is in (cm$^3$/s cm$^2$ cm Hg), each of said hollow fibers also having an effective length falling within the range of from about 0.2 to 100 centimeters.

49. The membrane module of claim 48 wherein said ratio of permeability (P) to total wall thickness (l) of each said hollow fiber preferably falls within the range of from about $1 \times 10^{-5}$ to $1 \times 10^{-3}$.

50. The membrane module of claim 47 wherein said length of each said hollow fiber preferably falls within the range of from about 1.5 to 78 centimeters.

51. The membrane module of claim 48 wherein said length of each said hollow fiber preferably falls within the range of from about 1.5 to 12 centimeters.

52. The membrane module of claim 48 wherein said hollow fibers are arranged as individual hollow fibers.

53. The membrane module of claim 48 wherein said hollow fibers are arranged in a bundle of said hollow fibers.

54. The membrane module of claim 48 wherein said hollow fibers are arranged in a woven textile made of said hollow fibers.

55. The membrane module of claim 48 wherein said fibers are arranged in a carpet made of said hollow fibers.

56. A membrane module for separating a fluid mixture into permeate and retentate portions, said membrane module comprising:
(a) an elongated hollow casing having a pair of opposite ends and a flow pathway through the interior of said casing;
(b) at least a pair of elongated hollow pressure-resistant non-permeable support substrates disposed in said casing along opposite sides of said flow pathway through said casing, said support substrates extending longitudinally between said opposite ends of said casing and being spaced laterally from one another and defining at least one transport passage along one of said support substrates being sealably isolated from said flow pathway through said casing; and (c) a plurality of flexible hollow fibers of semipermeable membrane material defining flow channels therethrough and being capable of separating a raw fluid mixture into permeate and retentate portions, each of said hollow fibers having a pair of spaced opposite end portions and an elongated portion extending between and interconnecting said opposite end portions, said opposite end portions of said hollow fibers being attached to said support substrate such that said elongated portions of said hollow fibers are disposed within said flow pathway of said casing in contact with of a fluid mixture flowing therethrough so as to provide flow communication of the permeate portion of the mixture from the pathway of said casing through said fibers to and through said channels thereof to said transport passage defined by said support substrate, each of said hollow fibers having a ratio of permeability (P) to total wall thickness (l) falling within the range of from $1 \times 10^{-6}$ to $1 \times 10^{-2}$ where the ratio P/l is in (cm$^3$/s cm$^2$ cm Hg), each of said hollow fibers also having an effective length falling within the range of from about 0.2 to 100 centimeters.

57. The membrane module of claim 56 wherein said ratio of permeability (P) to total wall thickness (l) of each said hollow fiber preferably falls within the range of from about $1 \times 10^{-5}$ to $1 \times 10^{-3}$.

58. The membrane module of claim 55, wherein said length of each said hollow fiber preferably falls within the range of from about 1.5 to 78 centimeters.

59. The membrane module of claim 56 wherein said length of each said hollow fiber preferably falls within the range of from about 1.5 to 12 centimeters.

60. The membrane module of claim 56, wherein said hollow fibers are arranged as individual hollow fibers.

61. The membrane module of claim 56 wherein said hollow fibers are arranged in a bundle of said hollow fibers.

62. The membrane module of claim 56 wherein said hollow fibers are arranged in a woven textile made of said hollow fibers.

63. The membrane module of claim 56 wherein said hollow fibers are arranged in a carpet made of said hollow fibers.

64. A membrane element for separating a fluid mixture into permeate and retentate portions, said membrane element comprising:

(a) an elongated hollow pressure-resistant porous central support tube having an central interior passage and an exterior;

(b) at least one hollow transport artery mounted to and extending radially and longitudinally from one side portion of said central support tube, said hollow transport artery having a radial interior passage isolated from flow communication with said central interior passage of said central support tube; and (c) a plurality of flexible hollow fibers of semipermeable membrane material defining flow channels therethrough and being capable of separating a raw fluid mixture into permeate and retentate portions, each of said hollow fibers having a pair of spaced opposite end portions and an elongated tubular portion extending between and interconnecting said opposite end portions, said opposite end portions of said hollow fibers connected to said hollow support artery and being open and disposed in flow communication with said radial interior passage of said at least one hollow transport artery and isolated from flow communication with said central passage of said central support tube, said elongated portions of said hollow fibers extend about said exterior of said central support tube, each of said hollow fibers having a ratio of permeability (P) to total wall thickness (l) falling within the range of from $1 \times 10^{-6}$ to $1 \times 10^{-2}$ where the ratio P/l is in (cm$^3$/s cm$^2$ cm Hg), each of said hollow fibers also having an effective length falling within the range of from about 0.2 to 100 centimeters.

65. The membrane element of claim 64 comprising at least two of said hollow transport arteries.

66. The membrane element of claim 64 wherein said ratio of permeability (P) to total wall thickness (l) of each said hollow fiber preferably falls within the range of from about $1 \times 10^{-5}$ to $1 \times 10^{-3}$.

67. The membrane element of claim 64 wherein said length of each said hollow fiber preferably falls within the range of from about 1.5 to 78 centimeters.

68. The membrane element of claim 64 wherein said length of each said hollow fiber preferably falls within the range of from about 1.5 to 12 centimeters.

69. The membrane element of claim 64 wherein said hollow fibers are arranged as individual hollow fibers.

70. The membrane element of claim 64 wherein said hollow fibers are arranged in a bundle of said hollow fibers.

71. The membrane element of claim 64 wherein said hollow fibers are arranged in a textile made of said hollow fibers.

* * * * *